United States Patent
Tsukamoto et al.

(10) Patent No.: US 12,555,772 B2
(45) Date of Patent: *Feb. 17, 2026

(54) MANUFACTURING METHOD OF ELECTRODE PLATE, MANUFACTURING METHOD OF SECONDARY BATTERY, ELECTRODE PLATE, AND SECONDARY BATTERY

(71) Applicant: PRIME PLANET ENERGY & SOLUTIONS, INC., Tokyo (JP)

(72) Inventors: Kentaro Tsukamoto, Kobe (JP); Yoshifumi Magari, Hirakata (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 658 days.

This patent is subject to a terminal disclaimer.

(21) Appl. No.: 17/860,199

(22) Filed: Jul. 8, 2022

(65) Prior Publication Data
US 2023/0021118 A1    Jan. 19, 2023

(30) Foreign Application Priority Data
Jul. 16, 2021  (JP) .................................. 2021-117995

(51) Int. Cl.
*H01M 4/139*    (2010.01)
*H01M 10/0525*    (2010.01)
*H01M 10/0587*    (2010.01)

(52) U.S. Cl.
CPC ....... *H01M 4/139* (2013.01); *H01M 10/0525* (2013.01); *H01M 10/0587* (2013.01)

(58) Field of Classification Search
None
See application file for complete search history.

(56) References Cited

U.S. PATENT DOCUMENTS

2010/0028767 A1    2/2010    Inose et al.
2013/0306608 A1    11/2013    Schaefer
(Continued)

FOREIGN PATENT DOCUMENTS

EP    4 037 008 A1    8/2022
EP    4 037 089 A1    8/2022
(Continued)

OTHER PUBLICATIONS

Zemaitis et al., Sci. Rep. 2018, 8, 17376 (Year: 2018).*
(Continued)

*Primary Examiner* — Jeffrey T Barton
(74) *Attorney, Agent, or Firm* — Finnegan, Henderson, Farabow, Garrett and Dunner, LLP

(57) ABSTRACT

According to the present disclosure, it is possible to inhibit the electrically conductive foreign substance from falling off and being peeled off from the electrode plate that has been already manufactured, so as to contribute in improving the safety property of the secondary battery. The manufacturing method of the electrode plate herein disclosed includes a precursor preparing step for preparing an electrode precursor 20A including an active substance provided area A1 in which an electrode active substance layer 24 is provided on a surface of the electrode substrate 22 and including a substrate exposed area A2 in which the electrode active substance layer 24 is not provided and the electrode substrate 22 is exposed, an active substance provided area cutting step for cutting the active substance provided area A1 by a pulse laser, and a substrate exposed area cutting step for cutting the substrate exposed area A2 by the pulse laser. Then, the frequency of the pulse laser in the substrate exposed area cutting step is made to be larger than the frequency of the pulse laser in the active substance provided area cutting step, and the lap rate of the pulse laser in the
(Continued)

substrate exposed area cutting step is made to be equal to or more than 90%. According to the manufacturing method of the electrode plate as described above, it is possible to inhibit the electrically conductive foreign substance from falling off and being peeled off from the electrode plate that has been already manufactured, and thus it is possible to contribute in improving the safety property of the secondary battery.

5 Claims, 12 Drawing Sheets

(56) References Cited

U.S. PATENT DOCUMENTS

| | | |
|---|---|---|
| 2016/0036009 A1 | 2/2016 | Cho et al. |
| 2020/0212498 A1* | 7/2020 | Kitamura .......... H01M 10/0525 |
| 2022/0109147 A1* | 4/2022 | Tamura ................ H01M 4/463 |
| 2022/0393250 A1 | 12/2022 | Tsukamoto et al. |
| 2023/0021118 A1 | 1/2023 | Tsukamoto et al. |
| 2023/0042958 A1 | 2/2023 | Tsukamoto et al. |

FOREIGN PATENT DOCUMENTS

| | | |
|---|---|---|
| JP | S64-052376 A | 2/1989 |
| JP | 2004-310051 A | 11/2004 |
| JP | 2007-014993 | 1/2007 |
| JP | 2010-034009 | 2/2010 |
| JP | 2012-221912 A | 11/2012 |
| JP | 2014-504429 A | 2/2014 |
| JP | 2015-139820 A | 8/2015 |
| JP | 2016-033912 | 3/2016 |
| JP | 2016-219327 A | 12/2016 |
| JP | 2023-13654 A | 1/2023 |
| JP | 2023-013655 A | 1/2023 |
| KR | 10-2008-0101725 A | 11/2008 |
| KR | 10-2016-0015013 A | 2/2016 |
| WO | WO 2016-208686 A1 | 12/2016 |
| WO | WO 2020/170598 A1 | 8/2020 |
| WO | WO 2021/085202 A1 | 5/2021 |

OTHER PUBLICATIONS

Non Final Office Action issued in U.S. Appl. No. 17/860,183, dated May 19, 2025.

Notice of Allowance issued in U.S. Appl. No. 17/860,183, dated Oct. 17, 2025.

* cited by examiner

MANUFACTURING METHOD OF ELECTRODE PLATE, MANUFACTURING METHOD OF SECONDARY BATTERY, ELECTRODE PLATE, AND SECONDARY BATTERY

CROSS REFERENCE TO RELATED APPLICATIONS

The present application claims the priority based on Japanese Patent Application No. 2021-117995 filed on Jul. 16, 2021, the entire contents of which are incorporated in the present specification by reference.

BACKGROUND

1. Technical Field

The present disclosure relates to a manufacturing method of an electrode plate, a manufacturing method of a secondary battery, an electrode plate, and a secondary battery.

2. Description of the Related Art

The secondary battery, such as a lithium ion secondary battery, includes an electrode body, for example, in which a positive electrode plate and a negative electrode plate are opposed to each other through a separator. Hereinafter, these positive electrode plate and negative electrode plate are collectively referred to as "electrode plate". This electrode plate includes, for example, an electrode substrate that is a foil-shaped metal member, and an electrode active substance layer that is provided on the surface of the electrode substrate and contains an electrode active substance. In manufacturing an electrode plate having the configuration as described above, firstly, the electrode active substance layer is provided on the surface of a large-sized electrode substrate. By doing this, a precursor of the electrode plate (hereinafter, referred to as "electrode precursor") is manufactured. Then, by using a laser, or the like, a desired size of electrode plate is cut out from the electrode precursor. Examples of the technique related to cut out of the electrode plate as described above are disclosed in JP2010-34009 and JP2016-33912.

The electrode precursor having the above described configuration tends to have the thickness of the electrode active substance layer being nonuniform at the outer circumferential edge part of the area on which the electrode active substance layer is provided (active substance provided area). Thus, in order to cut out the electrode plate from the electrode precursor, normally, the outer circumferential edge part of the active substance provided area is excised by the laser. Additionally, regarding a normal electrode plate, it is required to provide a portion in which the electrode substrate (metal foil) is exposed, in order to secure a connecting position to the electrically conductive member, such as an electrode terminal. Thus, for cutting out the electrode plate, a part of the area (substrate exposed area), in which the electrode active substance layer is not provided and the base material for electrode substrate is exposed, is cut out so as to form the electrode tab. As just described above, in manufacturing the electrode plate, a step for cutting the active substance provided area and a step for cutting the substrate exposed area are performed (see, for example, JP2010-34009).

SUMMARY

However, the electrode plate manufactured by the above described manufacturing method includes a feature that a broken piece of the electrode active substance layer or a fine metal piece (sputter) easily falls off or is peeled off. Then, if these electrically conductive foreign substances fall off or are peeled off inside the secondary battery, it can be a cause of generating the internal short circuit.

The present disclosure has been made in view of the above described circumstances, and has a purpose of providing a technique for inhibiting the electrically conductive foreign substance from falling off or being peeled off from the electrode plate that has been already manufactured and thus for contributing in improving the safety property of the secondary battery.

The inventor has performed various studies in order to solve the above circumstances. As a result, the inventor has found the causes respectively for generating the fall off or peel off of the broken piece of the electrode active substance layer and for generating the fall off or peel off of the sputter.

At first, the cause of the broken piece of electrode active substance layer falling off and being peeled off will be described. As just described above, in manufacturing the electrode plate, excision is performed on the outer circumferential edge part of the active substance provided area by the laser. At that time, it might happen that the electrode substrate melts by the heat due to the laser so as to be mixed with a part of the electrode active substance layer. Then, the electrode active substance layer mixed with that melt metal has the adhesive property being greatly reduced so as to fall off and be peeled off easily by the slight impact. The inventor has thought that, for suppressing the reduction in the adhesive property of the electrode active substance layer caused by contamination of this melt metal, the pulse laser would be used to cut the active substance provided area. The pulse laser as described above can repeatedly perform the spot irradiation by the very short time interval, thus it is possible to apply large energy on the cut portion in a concentrated manner. As a result, it is possible to promptly cut the electrode substrate in a state that the melt amount is small.

Next, the cause of having the fine metal piece (sputter) falling off and being peeled off will be described. As just described above, in manufacturing the electrode plate, it is desired for forming the electrode tab to cut out a part of the substrate exposed area. However, if the high energy laser is irradiated to the portion on which the metal member is exposed, such as the substrate exposed area, the sputter could be scattered from the irradiated portion. Then, when this sputter is stuck on the electrode plate, it becomes a fine metal piece that easily falls off and is easily peeled off by the slight impact. The inventor has thought that, for suppressing this sputter from being scattered, the continuous wave laser (CW laser) would be used to cut the substrate exposed area. This CW laser is to continuously irradiate low energy laser so as to perform melt cutting on the electrode substrate. As a result, it is possible to form the electrode tab, while suppressing the sputter from being scattered.

As described above, according to the study of the inventor, the pulse laser should be used for cutting the active substance provided area, in order to inhibit the broken piece of the electrode active substance layer from falling off. And, the CW laser should be used for cutting the substrate exposed area, in order to inhibit the sputter from falling off. However, a method, in which the laser to be used is switched so as to individually cut the active substance provided area and the substrate exposed area, would cause drastic reduction in the manufacture efficiency. Thus, it is hard to adopt this method in the real manufacturing floor. Additionally, in the case where the active substance provided area and the substrate exposed area are individually cut, it is required to connect the cut lines formed on respective areas without deviation. Thus, the cutting method could cause frequent occurrence of the cut failure. In consideration of the circumstance as described above, the inventor has studied about a method that not only can inhibit generations of both of 2 kinds of electrically conductive foreign substances described above, but also can continuously cut the active substance provided area and the substrate exposed area.

The manufacturing method of an electrode plate herein disclosed is made on the basis of the above described knowledge and is to manufacture the electrode plate that includes an electrode substrate being a metal foil and includes an electrode active substance layer being provided on a surface of an electrode substrate and containing an electrode active substance. Then, the manufacturing method of the electrode plate as described above includes a precursor preparing step for preparing an electrode precursor that includes an active substance provided area in which an electrode active substance layer is provided on a surface of an electrode substrate and that includes a substrate exposed area in which an electrode substrate is exposed while an electrode active substance layer is not provided, the manufacturing method includes an active substance provided area cutting step for cutting an active substance provided area by a pulse laser, and the manufacturing method includes a substrate exposed area cutting step for cutting a substrate exposed area by a pulse laser. Then, in the manufacturing method of the electrode plate herein disclosed, a frequency of a pulse laser in a substrate exposed area cutting step is made to be larger than a frequency of a pulse laser in an active substance provided area cutting step, and a lap rate of a pulse laser in a substrate exposed area cutting step is made to be equal to or more than 90%.

The manufacturing method of the electrode plate having the above described configuration uses a pulse laser for cutting an active substance provided area. By doing this, it is possible to suppress the melt metal, which is derived from the electrode substrate, from contaminating the electrode active substance layer. Thus, it is possible to inhibit the broken piece of the electrode active substance layer from falling off and being peeled off from the electrode plate. On the other hand, the herein disclosed manufacturing method uses the pulse laser even for cutting the substrate exposed area, so as to continuously cut the active substance provided area and the substrate exposed area. By doing this, it is possible to inhibit drastic reduction in the manufacture efficiency or to inhibit the generation of the cut failure. However, in the herein disclosed manufacturing method, the state of the pulse laser for cutting the substrate exposed area is made to approximate the CW laser. Particularly, in the manufacturing method herein disclosed, a frequency of a pulse laser in a substrate exposed area cutting step is made to be larger than a frequency of a pulse laser in an active substance provided area cutting step. By doing this, even though the pulse laser is used, it is possible to make the impact at the time of laser cut be smaller. Furthermore, in the manufacturing method herein disclosed, a lap rate of a pulse laser in a substrate exposed area cutting step is made to be equal to or more than 90%. By doing this, the melt amount of the electrode substrate increases to the extent similar to the CW laser, and thus it will be able to perform melt cutting on the electrode substrate. As just described above, according to the herein disclosed manufacturing method, it is possible to make the impact at the time of laser cut be smaller and possible to make the melt amount of the melt cutting be larger. As a result, the scatter of the sputter is suppressed. As just described above, according to the manufacturing method of the electrode plate herein disclosed, it is possible to inhibit the electrically conductive foreign substance from falling off and being peeled off from the electrode plate that has been already manufactured. Thus, it is possible to contribute in improving the safety property of the secondary battery.

Additionally, in a suitable aspect of the manufacturing method of the electrode plate herein disclosed, a frequency of a pulse laser in an active substance provided area cutting step is 100 kHz to 2000 kHz. By doing this, it is possible to more properly inhibit the broken piece of the electrode active substance layer from falling off and being peeled off.

Additionally, in a suitable aspect of the manufacturing method of the electrode plate herein disclosed, a frequency of a pulse laser in a substrate exposed area cutting step is 450 KHz to 4000 KHz. By doing this, it is possible to more suitably inhibit the sputter from falling off and being peeled off.

Additionally, in a suitable aspect of the manufacturing method of the electrode plate herein disclosed, a lap rate of a pulse laser in an active substance provided area cutting step is smaller than a lap rate of a pulse laser in a substrate exposed area cutting step. By doing this, it is possible to more properly inhibit both of the broken piece of the electrode active substance layer and the sputter from falling off and being peeled off.

As another aspect of the herein disclosed technique, a manufacturing method of a secondary battery is provided. Particularly, the herein disclosed technique relates to a manufacturing method of a secondary battery for manufacturing a secondary battery provided with an electrode body in which a pair of electrode plates are opposed to each other through a separator, and the manufacturing method of the electrode plate having the above described configuration is used to manufacture at least one of the pair of electrode plates. According to the manufacturing method as described above, it is possible to suppress the electrically conductive foreign substance (broken piece of the electrode active substance layer and sputter) from falling off and being peeled off from the electrode plate inside the secondary battery, and thus it is possible to obtain the secondary battery whose safety property is outstanding.

In addition, according to the manufacturing method of the electrode plate herein disclosed, an electrode plate including the below described configuration is manufactured. In particular, the electrode plate having been already manufactured includes an electrode substrate that is a foil-shaped metal member, and includes an electrode active substance layer that is provided on a surface of an electrode substrate and that contains an electrode active substance. Then, this electrode plate includes an electrode plate main body part in which an electrode active substance layer is provided on a surface of an electrode substrate, and includes an electrode tab that is an area in which an electrode active substance layer is not provided and an electrode substrate is exposed and that protrudes toward an outside from one part of an outer circumferential edge part of an electrode plate main body part. Then, in the herein disclosed electrode plate, at an outer circumferential edge part of an electrode tab, a first thick part is formed whose thickness is larger than a central part of an electrode tab, and an aspect ratio of a first thick part in a cross section view along a thickness direction of an electrode tab is equal to or more than 0.85. Furthermore, at an end part of an electrode substrate in at least one side of an outer circumferential edge part of an electrode plate main body part, a second thick part is formed whose thickness is larger than an electrode substrate at a central part of an electrode plate main body part, and a surface of a second thick part is stuck with a coating layer containing an electrode active substance.

On the electrode plate including the above described configuration, the first thick part is formed at the outer circumferential edge part of the electrode tab. The first thick part as described above is a trace mark on which the laser cut has been performed. Then, in the manufacturing method of the electrode plate having the above described configuration, the condition of the pulse laser is made to approximate the CW laser at the time of cutting out (cutting the substrate exposed area) the electrode tab. When the melt cutting is performed with the pulse laser as described above, the melt amount of the electrode substrate becomes at a level similar to the CW laser, and thus the cross sectional shape of the cut trace (first thick part) can become an approximately round (aspect ratio is equal to or more than 0.85). On the other hand, in the manufacturing method of the electrode plate having the above described configuration, the reduction in the adhesive property of the electrode active substance layer caused by the contamination of the melt metal should be suppressed at the time of cutting out the electrode plate main body part (cutting the active substance provided area), and thus the high energy pulse laser is used. Therefore, the coating layer containing the electrode active substance can stick on the laser cut trace (second thick part) formed at the outer circumferential edge part of the electrode plate main body part. The coating layer as described above is hardly peeled off and hardly falls off from the electrode substrate, which is different from the electrode active substance layer in which the melt metal is contaminated.

In addition, in a suitable aspect of the herein disclosed electrode plate, the second thick part has a claw hook shape including a shade part that protrudes at the both sides or one side in a thickness direction and including a recessed part that is formed between the shade part and an electrode substrate. As just described above, the second thick part is a laser cut trace formed by a high energy pulse laser. By using the high energy pulse laser, the metal melt amount during cutting becomes very small, and thus it happens to form a cut trace (second thick part) having the claw hook shape as described above. The second thick part having this claw hook shape induces the outstanding anchor effect, and thus it is possible to further suitably inhibit the fall off and peel off of the electrode active substance layer.

Additionally, in a suitable aspect of the herein disclosed electrode plate, a thickness of a coating layer sticking on a surface of a second thick part is 1 μm to 20 μm. By doing this, it is possible to make the coating layer of the electrode active substance properly cover the second thick part, and thus it is possible to suitably inhibit the second thick part from causing damage on another member (for example, separator of the secondary battery).

Additionally, in a suitable aspect of the herein disclosed electrode plate, a center point of a first thick part is arranged between a pair of extended lines extending from respective surfaces of a central part of an electrode tab. The bending process on the electrode tab is easy for the electrode plate having the configuration as described above, and thus it is possible to contribute in enhancing the manufacture efficiency of the secondary battery. This kind of first thick part can be formed by cutting out the electrode tab with the pulse laser whose condition is approximated to the CW laser as described above.

Additionally, in a suitable aspect of the herein disclosed electrode plate, a first thick part includes a first area whose thickness is relatively large and a second area whose thickness is relatively small, and a first area and a second area are alternately formed along an outer circumferential edge part of an electrode tab. The manufacturing method of the electrode plate having the above described configuration uses the pulse laser whose lap rate is equal to or more than 90% to perform melt cutting on the electrode substrate (negative electrode tab). In that case, the melted electrode substrate is deformed into an approximately spherical shape due to the surface tension, and thus the first area being the melt metal dense portion and the second area being the melt metal sparse portion are alternately formed.

In addition, according to the manufacturing method of the secondary battery herein disclosed, a secondary battery having a below described configuration is manufactured. Particularly, regarding the herein disclosed technique, the secondary battery provided with an electrode body in which a pair of electrode plates are opposed through a separator is characterized by using the electrode plate having the above described configuration for at least one among the pair of electrode plates. By doing this, it is possible to suppress the electrically conductive foreign substance (broken piece of the electrode active substance layer, or sputter) from being separated from the electrode plate, and thus it is possible to contribute in improving the safety property of the secondary battery.

DETAILED DESCRIPTION

Below, while referring to drawings, an embodiment of the herein disclosed technique is explained. Incidentally, the matters other than matters particularly mentioned in this specification, and required for practicing the present disclosure (for example, a general configuration and manufacture process of the battery) can be grasped as design matters of those skilled in the art based on the conventional technique in the present field. The herein disclosed technique can be executed based on the contents disclosed in the present specification, and on the technical common sense in the present field. Incidentally, the wording "A to B" representing a range means a content equal to or more than A and not more than B, and further semantically covers meanings "preferably more than A" and "preferably less than B".

Incidentally, in the present specification, the wording "secondary battery" represents an electric storage device in general that generates electrically charging and discharging reaction by the electric charge carrier moving between a pair of electrodes (positive electrode and negative electrode) through an electrolyte. The secondary battery as described above semantically covers a so-called storage battery, such as lithium ion secondary battery, nickel hydrogen battery, and nickel cadmium battery, and further covers a capacitor, such as electric double layer capacitor, and the like. Hereinafter, an embodiment in a case where the lithium ion secondary battery is the object among the above described secondary batteries will be described.

<Manufacturing Method of Electrode Plate>

Figure 1:
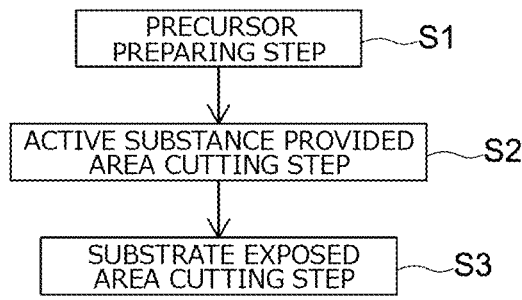
FIG. 1 is a flow chart that shows a manufacturing method of an electrode plate in accordance with one embodiment.
Figure 2:
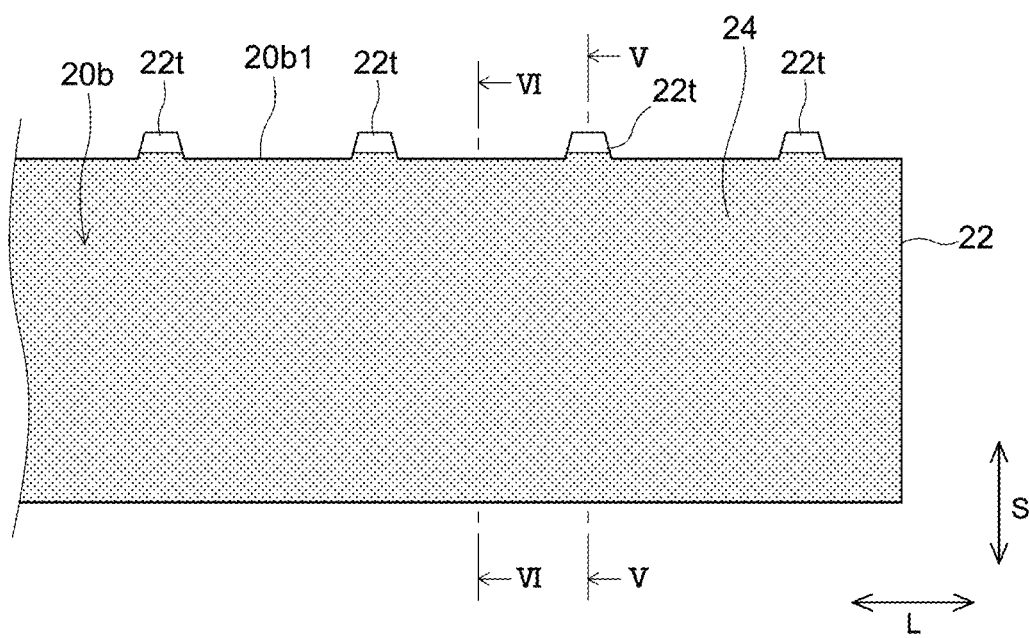
FIG. 2 is a plane view that schematically shows a negative electrode plate manufactured by the manufacturing method of the electrode plate in accordance with one embodiment.
Figure 3:
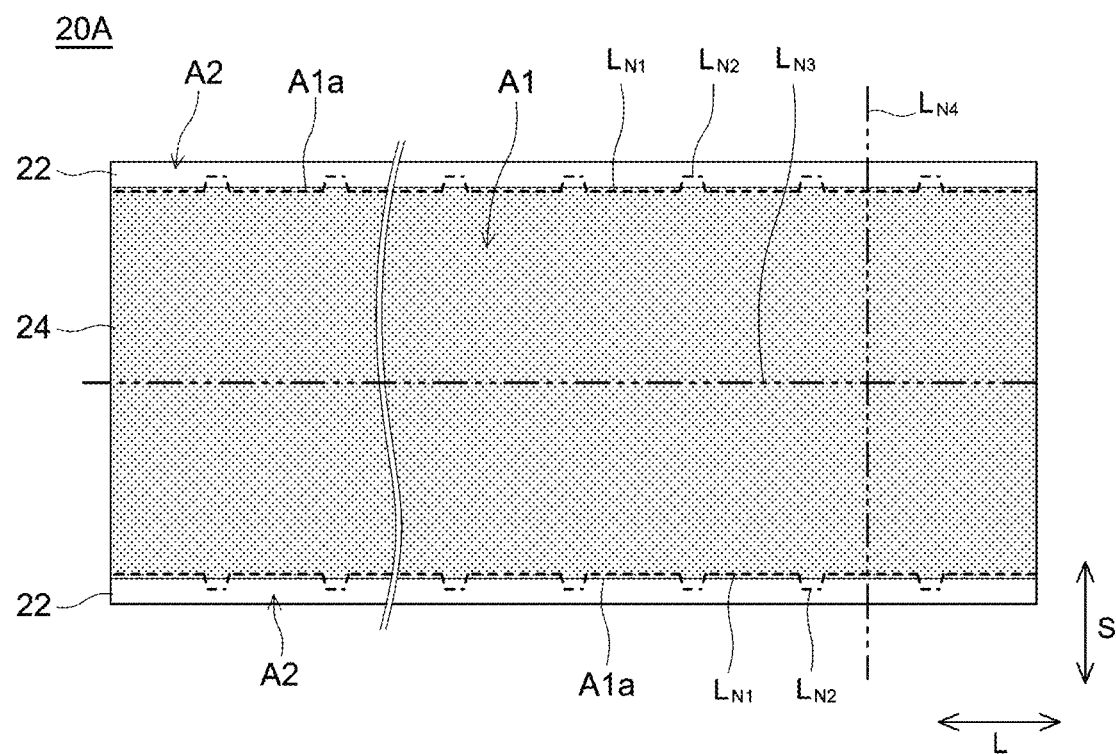
FIG. 3 is a plane view for explaining the manufacturing method of the electrode plate in accordance with one embodiment.
Figure 4:
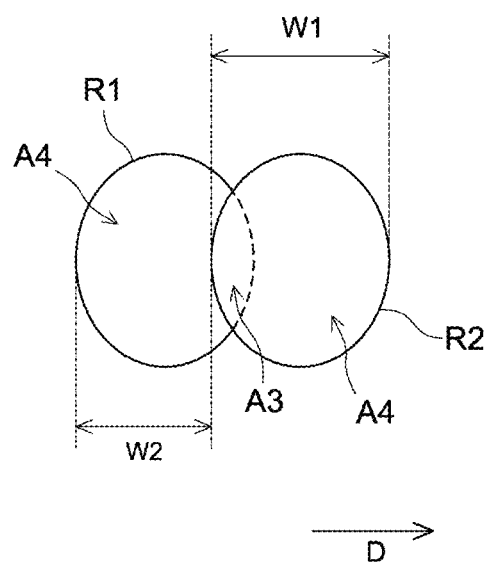
FIG. 4 is a view for explaining a lap rate of a pulse laser.
Figure 5:
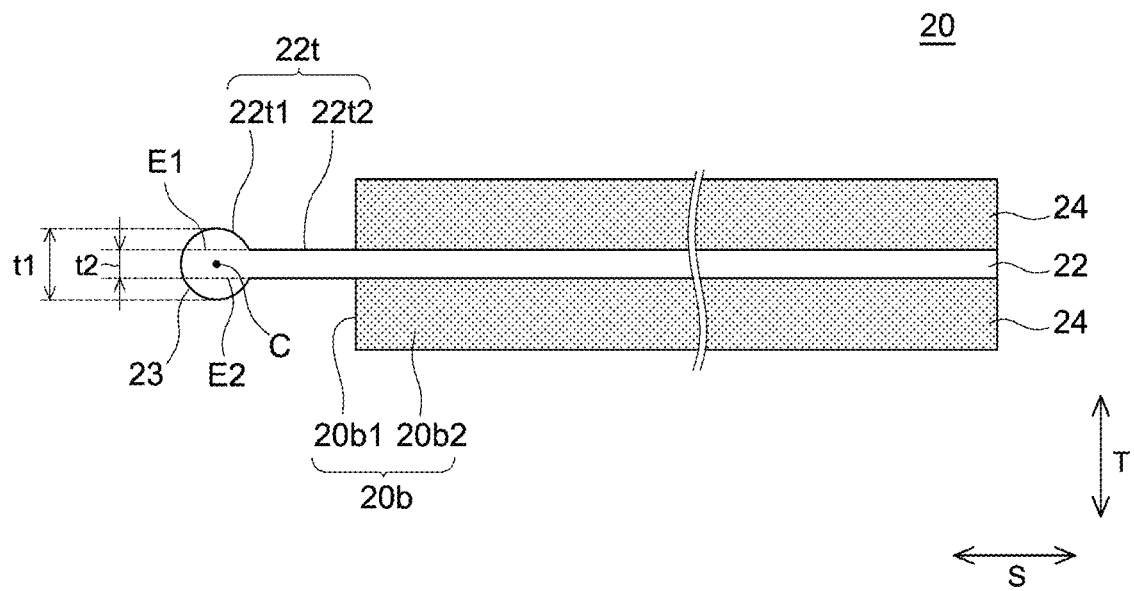
FIG. 5 is a cross sectional view that is shown from the V-V direction of FIG. 2.
Figure 6:
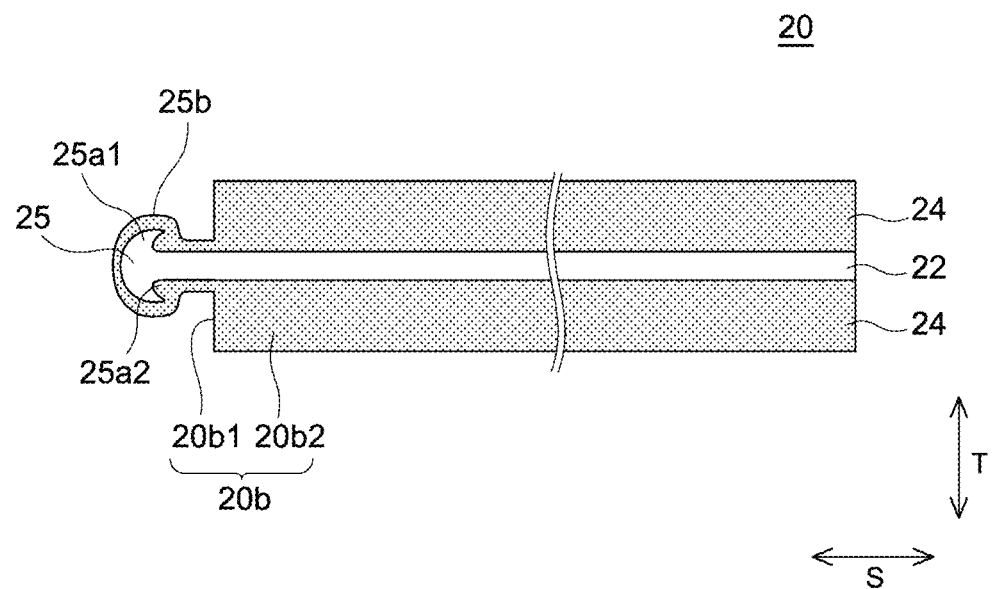
FIG. 6 is a cross sectional view that is shown from the VI-VI direction of FIG. 2.

The manufacturing method of the electrode plate herein disclosed is a method for manufacturing an electrode plate that includes an electrode substrate being a metal foil, and includes an electrode active substance layer being provided on the surface of the electrode substrate and including an electrode active substance. Below, as one embodiment for the manufacturing method of the electrode plate herein disclosed, a method will be explained that is for manufacturing an electrode plate (negative electrode plate) at a negative electrode side of a secondary battery. FIG. 1 is a flow chart that shows the manufacturing method of the electrode plate in accordance with the present embodiment. FIG. 2 is a plane view that schematically shows the negative electrode plate manufactured by the manufacturing method of the electrode plate in accordance with the present embodiment. FIG. 3 is a plane view for explaining the manufacturing method of the electrode plate in accordance with the present embodiment. In addition, FIG. 4 is a view for explaining a lap rate of a pulse laser. FIG. 5 is a cross sectional view that is shown from the V-V direction of FIG. 2. In addition, FIG. 6 is a cross sectional view that is shown from the VI-VI direction of FIG. 2. Incidentally, in FIGS. 2, 3, 5, and 6, the reference sign L represents the "longitudinal direction" of the negative electrode plate 20 (or negative electrode precursor 20A), the reference sign S represents the "short-transverse direction", and the reference sign T represents the "thickness direction".

As shown in FIG. 1, the manufacturing method of the electrode plate in accordance with the present embodiment includes a precursor preparing step S1, an active substance provided area cutting step S2, and a substrate exposed area cutting step S3. By doing this, the negative electrode plate 20 whose configuration is shown in FIG. 2 is manufactured. Below, an overview will be explained that is for the negative electrode plate 20 being the manufacture target, and then each step will be explained that is shown in FIG. 1.

(Overview of Negative Electrode Plate)

As shown in FIG. 2, the negative electrode plate 20 is a long strip-like shaped member. The negative electrode plate 20 includes a negative electrode substrate 22 that is a foil-shaped metal member, and includes a negative electrode active substance layer 24 that is provided on the surface of the negative electrode substrate 22. Incidentally, it is preferable from the perspective of the battery performance that the negative electrode active substance layer 24 is provided on both surfaces of the negative electrode substrate 22. Then, this negative electrode plate 20 in a plane view includes two areas being an electrode plate main body part 20b and a negative electrode tab 22t. The electrode plate main body part 20b is an area where a negative electrode active substance layer 24 is provided on the surface of the negative electrode substrate 22. On the other hand, the negative electrode tab 22t is an area where the negative electrode active substance layer 24 is not provided and where the negative electrode substrate 22 is exposed. In addition, the negative electrode tab 22t protrudes from one part of an outer circumferential edge part 20b1 of the electrode plate main body part 20b toward the outside (upward in the short-transverse direction S in FIG. 2). In addition, the negative electrode plate 20 shown in FIG. 2 includes a plurality of negative electrode tabs 22t. These plural negative electrode tabs 22t are provided away from each other by a predetermined distance in the longitudinal direction L of the negative electrode plate 20.

As for each of members configuring the negative electrode plate 20, a material used in a conventional and general secondary battery can be used without particular restriction. For example, a metal material having a predetermined electrically conductive property can be used preferably for the negative electrode substrate 22. It is preferable that the negative electrode substrate 22 as described above is made of, for example, copper or copper alloy. In addition, regarding the thickness of the negative electrode substrate 22, 2 μm to 30 μm is preferable, 3 μm to 20 μm is more preferable, and 5 μm to 15 μm is furthermore preferable.

The negative electrode active substance layer 24 is a layer containing a negative electrode active substance. As the negative electrode active substance, a material capable of reversibly storing and emitting an electric charge carrier can be used, in consideration of the relation with the positive electrode active substance. For the negative electrode active substance as described above, it is possible to use a carbon material, a silicon type material, or the like. As the carbon material, for example, it is possible to use a graphite, a hard carbon, a soft carbon, an amorphous carbon, or the like. In addition, it is possible to use an amorphous carbon covered graphite in which the surface of the graphite is covered by the amorphous carbon. On the other hand, as the silicon type material, it is possible to use a silicon, a silicon oxide (silica), or the like. In addition, the silicon type material might contain another metal element (e.g., alkaline earth metal) or its oxide. In addition, the negative electrode active substance layer 24 might contain an additive agent other than the negative electrode active substance. For one example of the additive agent as described above, it is possible to use a binder, a thickening agent, or the like. As for a specific example of the binder, it is possible to use a rubber type binder, such as styrene butadiene rubber (SBR). In addition, as for a specific example of the thickening agent, it is possible to use carboxy methyl cellulose (CMC), or the like. Incidentally, in the case where the whole solid content of the negative electrode active substance layer 24 is treated as 100 mass %, the content amount of the negative electrode active substance is approximately equal to or more than 30 mass %, or typically equal to or more than 50 mass %. Incidentally, the negative electrode active substance might occupy 80 mass % or more of the negative electrode active substance layer 24, or might occupy 90 mass % or more of it. In addition, regarding the thickness of the negative electrode active substance layer 24, 10 μm to 500 μm is preferable, 30 μm to 400 μm is more preferable, and 50 μm to 300 μm is furthermore preferable.

The negative electrode plate 20 having the above described configuration is, as shown in FIG. 1, manufactured by performing the precursor preparing step S1, the active substance provided area cutting step S2, and the substrate exposed area cutting step S3. Below, each of steps will be described.

(Precursor Preparing Step S1)

The present step is to prepare an electrode precursor that is a precursor of the electrode plate. The electrode precursor shown in FIG. 3 is a precursor of the negative electrode plate (negative electrode precursor 20A). This negative electrode precursor 20A includes a negative electrode substrate 22 that is a metal foil formed in a strip-like shape. The area of the negative electrode substrate 22 of the negative electrode precursor 20A is larger than the area of the negative electrode plate 20 that has been already manufactured (see FIG. 2). Then, on the surface of the negative electrode substrate 22, the negative electrode active substance layer 24 is provided. Incidentally, the negative electrode active substance layer 24 is provided at the central part of the negative electrode substrate 22 in the short-transverse direction S to extend along the longitudinal direction L. In the present specification, the area where this negative electrode active substance layer 24 is provided is referred to as "negative electrode active substance provided area A1". On the other hand, the both side edge parts of the negative electrode precursor 20A (area outside the negative electrode active substance layer 24 in the short-transverse direction S) fails to be provided with the negative electrode active substance layer 24 and thus has the negative electrode substrate 22 being exposed. In the present specification, the area in which the negative electrode substrate 22 is exposed as described above is referred to as "negative electrode substrate exposed area A2". The means for preparing the negative electrode precursor 20A having the above described configuration is not particularly restricted, and conventionally well known various methods can be adopted without particular restriction. For example, a raw material paste containing the negative electrode active substance and the like is applied to coat the surface of the negative electrode substrate 22 and then dried, so as to implement manufacturing the negative electrode precursor 20A. In addition, the present step is not particularly restricted if it is possible to prepare the negative electrode precursor 20A. For example, it is possible to purchase the negative electrode precursor 20A that has been independently manufactured, so as to perform the preparation. Incidentally, the negative electrode precursor is not restricted to the structure shown in FIG. 2. For example, regarding the negative electrode precursor, it is possible to adopt a structure in which the negative electrode substrate exposed area is formed at only one of the side edge parts.

(Active Substance Provided Area Cutting Step S2)

The present step is to cut the negative electrode active substance provided area A1 of the negative electrode precursor 20A by the pulse laser. Particularly, in the active substance provided area cutting step S2, the pulse laser is allowed to scan on the negative electrode active substance provided area A1 along the side edge parts A1a of the negative electrode active substance provided area A1, as shown by dotted lines $L_{N1}$ in FIG. 3. By doing this, it is possible to excise the side edge parts A1a of the negative electrode active substance provided area A1 of the negative electrode active substance layer 24 whose thickness is nonuniform, so as to implement manufacturing the negative electrode plate 20 whose thickness of the negative electrode active substance layer 24 is uniform. Here, when the negative electrode active substance provided area A1 is cut by the laser as shown by the above described dotted lines $L_{N1}$, there is a possibility that a part of the negative electrode substrate 22 melted by the heat of the laser contaminates the negative electrode active substance layer 24. Then, if the melt metal as described above is solidified in the negative electrode active substance layer 24, the adhesive property of the negative electrode active substance layer 24 is drastically lost, and thus there is a risk that the broken piece of the negative electrode active substance layer 24 easily falls off or is easily peeled off by the slight impact. Here, at the active substance provided area cutting step S2 in the present embodiment, in order to inhibit the reduction in the adhesive property caused by the contamination of the melt metal as described above, the pulse laser is used for cutting the negative electrode active substance provided area A1, and the frequency of the pulse laser in this active substance provided area cutting step S2 is set to be smaller than the frequency of the pulse laser in the substrate exposed area cutting step S3 described later. Using this kind of the pulse laser whose frequency is small can implement adding large energy by a short time interval in a concentrated manner (peak output is high), and thus it is possible to promptly cut the negative electrode substrate 22 in a state that the melt amount is small. By doing this, it is possible to suppress the reduction in the adhesive property of the negative electrode active substance layer 24 caused by the contamination of the melt metal, and thus it is possible to inhibit the broken piece of the negative electrode active substance layer 24 from falling off or being peeled off.

Incidentally, regarding the particular frequency of the pulse laser in the active substance provided area cutting step S2, 2000 KHz or less is preferable, 1500 KHz or less is further preferable, and 1000 KHz or less is furthermore preferable. By doing this, it is possible to further enhance the peak output for cutting the negative electrode active substance provided area A1, and thus it is possible to more easily cut the negative electrode precursor 20A while inhibiting the melt negative electrode substrate 22 from contaminating the negative electrode active substance layer 24. On the other hand, regarding the lower limit value of the frequency of the pulse laser in the active substance provided area cutting step S2, 100 KHz or more is preferable, 150 KHz or more is further preferable, and 200 KHz or more is furthermore preferable. By further increasing the frequency of the pulse laser as described above, the peak output becomes smaller, and thus it is possible to inhibit a part of the negative electrode active substance layer 24, on which the laser is irradiated, from being blown off.

Incidentally, the condition for the pulse laser in the active substance provided area cutting step S2 is not particularly restricted, and thus it is preferable that the condition is appropriately adjusted in accordance with the structure of the negative electrode precursor 20A (typically, the thickness or material of the negative electrode active substance layer 24 or negative electrode substrate 22). For example, regarding the average output of the pulse laser in the present step, 70 W to 1000 W is preferable, 100 W to 900 W is more preferable, and 150 W to 800 W is furthermore preferable. By doing this, it is possible, while inhibiting the negative electrode active substance layer 24 from falling off and being peeled off, to easily cut the negative electrode precursor 20A. In particular, as the average output of the pulse laser becomes larger, cutting the negative electrode precursor 20A tends to become easier. On the other hand, the impact at the laser irradiation time becomes smaller as the average output of the pulse laser becomes smaller, and thus it is possible to inhibit a part of the negative electrode active substance layer 24 from being blown off due to the impact of the laser. In addition, regarding the spot diameter of the pulse laser in the active substance provided area cutting step S2, 10 µm to 60 µm is preferable, 20 µm to 50 µm is more preferable, and 25 µm to 40 µm is furthermore preferable. By doing this, it is possible to easily cut out the negative electrode plate 20 from the negative electrode precursor 20A.

Furthermore, it is preferable that the lap rate of the pulse laser in the active substance provided area cutting step S2 is smaller than the lap rate of the pulse laser in the substrate exposed area cutting step S3 described later. As the lap rate of the pulse laser is made to be smaller, cutting the negative electrode substrate 22 tends to become easier in a state that the melt amount is smaller. On the other hand, the state of the pulse laser becomes closer to the CW laser as the lap rate is made to be larger, and thus the occurrence of sputter described later tends to be further easily suppressed. Thus, in the active substance provided area cutting step S2 in which a problem about the contamination of the melted negative electrode substrate 22 tends to occur, it is preferable to use a pulse laser whose lap rate is smaller. Regarding the particular lap rate of the pulse laser in the active substance provided area cutting step S2, 40% to 95% is preferable, 50% to 90% is more preferable, and 70% to 90% is furthermore preferable.

Next, regarding the scanning speed of the pulse laser in the active substance provided area cutting step S2, 5000 mm/sec or less is preferable, and 3000 mm/sec or less is further preferable. Making the scanning speed be slower as described above can suppress the cut failure of the negative electrode substrate 22. On the other hand, the lower limit value of the scanning speed of the pulse laser is not particularly restricted, and the lower limit value might be equal to or more than 20 mm/sec. Incidentally, from the perspective of enhancing the manufacture efficiency due to shortening of cutting time, regarding the lower limit value of the scanning speed of the pulse laser, 200 mm/sec or more is preferable, and 500 mm/sec or more is further preferable. In addition, regarding the pulse width of the pulse laser in the active substance provided area cutting step S2, 30 ns to 240 ns is preferable, and 60 ns to 120 ns is more preferable. By doing this, it is possible to suitably inhibit the melted negative electrode substrate 22 from contaminating the negative electrode active substance layer 24. In particular, the peak output tends to be enhanced better as the pulse width of the pulse laser becomes shorter, and thus it can facilitate decreasing the melt amount of the negative electrode substrate 22 at the laser cutting time. On the other hand, the impact added to the negative electrode active substance layer 24 becomes smaller as the pulse width becomes longer, and thus it can inhibit a part of the negative electrode active substance layer 24 from being blown off at the laser irradiation time.

(Substrate Exposed Area Cutting Step S3)

The present step is to cut the negative electrode substrate exposed area A2 of the negative electrode precursor 20A by the pulse laser. Particularly, in the substrate exposed area cutting step S3, firstly, the pulse laser is allowed to scan from the negative electrode active substance provided area A1 toward the negative electrode substrate exposed area A2 along the short-transverse direction S of the negative electrode precursor 20A, as shown by the dotted lines $L_{N2}$ in FIG. 3. Then, the pulse laser is allowed to scan for a predetermined distance along the longitudinal direction L of the negative electrode precursor 20A, and after that, the pulse laser is allowed to scan along the short-transverse direction S toward the negative electrode active substance provided area A1, again. By doing this, a part of the negative electrode substrate exposed area A2 is cut out to be in a convex shape so as to form the negative electrode tab 22*t* (see FIG. 2). Then, in the present embodiment, the active substance provided area cutting step S2 (dotted line $L_{N1}$ of FIG. 3) and the substrate exposed area cutting step S3 (dotted line $L_{N2}$ of FIG. 3) are repeated by every constant period. By doing this, it is possible to excise the side edge part A1*a* of the negative electrode active substance provided area A1 and further to cut out a plurality of negative electrode tabs 22*t*.

Here, in the manufacturing method of the electrode plate according to the present embodiment, the state of the pulse laser irradiated on the negative electrode substrate exposed area A2 in the substrate exposed area cutting step S3 is made to approximate the CW laser. Firstly, in the present embodiment, the frequency of the pulse laser (see dotted line $L_{N2}$ in FIG. 3) at the substrate exposed area cutting step S3 is made to be larger than the frequency of the pulse laser at the active substance provided area cutting step S2 (see dotted line $L_{N1}$ in FIG. 3). While just described above, the peak output tends to become smaller as the frequency of the pulse laser becomes larger. As this result, the impact for performing the laser cut of the negative electrode substrate exposed area A2 (negative electrode substrate 22) becomes smaller, and thus it becomes hard to cause the scatter of the sputter. Incidentally, regarding the particular frequency of the pulse laser in the substrate exposed area cutting step S3, 450 KHz or more is preferable, 1000 KHz or more is further preferable, and 2000 KHz or more is especially preferable. By doing this, it is possible to suitably inhibit the scatter of the sputter. On the other hand, regarding the frequency of the pulse laser in the substrate exposed area cutting step S3, 4000 KHz or less is preferable, 3500 KHz or less is further preferable, and 3000 KHz equal or less is especially preferable, from the perspective of securing a predetermined amount or more of the peak output and securing the cut efficiency for the negative electrode substrate exposed area A2.

Next, the manufacturing method of the electrode plate in accordance with the present embodiment controls the lap rate of the pulse laser to be equal to or more than 90% in order to make the state of the pulse laser in the substrate exposed area cutting step S3 be closer to the CW laser. In particular, the irradiation of the laser becomes closer to the continuous irradiation as the lap rate of the pulse laser becomes larger, thus it becomes easy to cause cuts whose melt amounts are larger as if the case of the CW laser, and therefore the scatter of the sputter is suppressed. Incidentally, regarding the lap rate of the pulse laser in the substrate exposed area cutting step S3, from the perspective of furthermore suitably suppressing the scatter of the sputter, 90.5% or more is preferable, 91% or more is further preferable, 91.5% or more is furthermore preferable, and 92% or more is especially preferable. On the other hand, the upper limit of the lap rate of the pulse laser in the substrate exposed area cutting step S3 might be equal to or less than 99%, which is not restricted particularly. However, as the lap rate becomes less, it becomes easier to increase the scanning speed of the pulse laser so that it tends to enhance the manufacture efficiency. From the perspective as described above, regarding the lap rate of the pulse laser in the substrate exposed area cutting step S3, 98.5% or less is preferable, 98% to or less is further preferable, 97.5% or less is furthermore preferable, and 97% or less is especially preferable.

Incidentally, as shown in FIG. 4, regarding the laser cut with the pulse laser, the irradiation is performed while a plurality of spots R1, R2 are shifted little by little in a predetermined scanning direction D. By doing this, an overlap irradiation area A3 is generated in which the adjacent spots R1, R2 are irradiated in an overlapped manner and a single irradiation area A4 is generated in which the single one among spots R1, R2 is irradiated. In the present specification, the "lap rate" is a value representing a degree at which the adjacent spots R1, R2 are overlapped in the irradiation of the pulse laser as described above. The lap rate Y as described above can be obtained on the basis of the below described Formula (1) in the case where the spot diameter is represented as W1 and the irradiation distance between the adjacent spots is represented as W2. Incidentally, any of the above described spot diameter W1 and the irradiation distance W2 is a length in a direction along the scanning direction D of the pulse laser. That is to say, in the case where oval spots R1, R2 as shown in FIG. 4 are irradiated, the spot diameter W1 means a diameter for the spots R1, R2 along the scanning direction D. Additionally, in the case where the oval spots are irradiated, each spot might be tilted with respect to the scanning direction D. Even in that case, the lengths along the scanning direction D are measured as the spot diameter W1 and irradiation distance W2 of each spot. Incidentally, regarding the particular spot diameter W1 of the pulse laser in the substrate exposed area cutting step S3, 10 μm to 60 μm is preferable, 20 m to 50 μm is more preferable, and 25 μm to 40 μm is furthermore preferable.

$$\text{Lap rate } Y(\%) = (W1 - W2)/W1 \times 100 \quad (1)$$

Incidentally, it is enough that the pulse laser in the substrate exposed area cutting step S3 satisfies the above described frequency and lap rate, and thus the pulse laser in the substrate exposed area cutting step S3 is not particularly restricted by the other conditions. For example, it is preferable that the other condition for the pulse laser in the substrate exposed area cutting step S3 is appropriately adjusted on the basis of the structure of the negative electrode substrate exposed area A2 (typically, the thickness or material of the negative electrode substrate 22). For example, regarding the pulse width of the pulse laser in the substrate exposed area cutting step S3, 10 ns or more is preferable, 30 ns or more is further preferable, and 120 ns or more is furthermore preferable. The heat affecting time applied to the metal member becomes longer and the melt part is expanded further as the pulse width of the pulse laser becomes longer, and thus the sputter tends to hardly occur. On the other hand, the upper limit value of the pulse width of the pulse laser in the substrate exposed area cutting step S3 might be equal to or less than 300 ns, or might be equal to or less than 240 ns. As the pulse width of the pulse laser becomes shorter, it tends to further facilitate making the negative electrode substrate exposed area A2 be cut.

In addition, the average output of the pulse laser in the substrate exposed area cutting step S3 might be 70 W to 2000 W, might be 100 W to 1800 W, or might be 200 W to 1500 W. Cutting the negative electrode substrate exposed area A2 tends to become easier as the average output of the pulse laser becomes larger. On the other hand, the impact at the laser irradiation time becomes smaller as the average output of the pulse laser becomes smaller, and thus the scattering of the sputter tends to hardly occur.

Next, regarding the scanning speed of the pulse laser in the substrate exposed area cutting step S3, 5000 mm/sec or less is preferable, and 3000 mm/sec or less is further preferable. The cut failure of the negative electrode substrate 22 tends to occur more hardly as the scanning speed is made to be slower. On the other hand, the lower limit value of the scanning speed of the pulse laser is not particularly restricted, and the lower limit value might be equal to or more than 20 mm/sec. Incidentally, from the perspective of enhancing the manufacture efficiency by shortening the cutting time, regarding the lower limit value of the scanning speed of the pulse laser, 200 mm/sec or more is preferable, and 500 mm/sec or more is further preferable. Incidentally, the scanning speeds of the pulse laser in the active substance provided area cutting step S2 and in the substrate exposed area cutting step S3 might be similar to each other.

(Another Step)

As just described above, in the manufacturing method according to the present embodiment, the active substance provided area cutting step S2 (dotted lines $L_{N1}$ of FIG. 3) and the substrate exposed area cutting step S3 (dotted lines $L_{N2}$ of FIG. 3) are repeated by every constant period to excise the side edge part A1a of the negative electrode active substance provided area A1 of the negative electrode active substance layer 24 whose thickness tends to be nonuniform, so as to form a plurality of negative electrode tabs 22t. Furthermore, in the manufacturing method according to the present embodiment, as shown by the two-dot chain lines $L_{N3}$ of FIG. 3, the central part of the negative electrode precursor 20A in the short-transverse direction S is cut along the longitudinal direction L. By doing this, as shown in FIG. 2, it is possible to manufacture the negative electrode plate 20 in which the negative electrode tab 22t is formed only at one side of the outer circumferential edge part 20b1 of the electrode plate main body part 20b. Additionally, in the present embodiment, as shown by the two-dot chain line $L_{N4}$, the negative electrode precursor 20A is cut along the short-transverse direction S at predetermined intervals in the length direction L. By doing this, it is possible to manufacture the negative electrode plate 20 having a desired length. Incidentally, the cutting step of the negative electrode precursor 20A along the two-dot chain lines $L_{N3}$, $L_{N4}$ might be performed by using a cut blade, a metal mold, a cutter, or the like, instead of laser cutting. Incidentally, in the case where laser cutting is used for cutting along the two-dot chain lines $L_{N3}$, $L_{N4}$, it is preferable to use pulse laser at a condition similar to the condition of the above described active substance provided area cutting step S2 (dotted lines $L_{N1}$). By doing this, it is possible to suitably suppress the broken piece of the negative electrode active substance layer 24 from being peeled off and falling off. In addition, it is enough that cutting along these two-dot chain lines $L_{N3}$, $L_{N4}$ is appropriately performed on the basis of the shape of the negative electrode plate that has been already manufactured, and cutting does not restrict the herein disclosed technique.

As described above, in the manufacturing method of the electrode plate in accordance with the present embodiment, the pulse laser is used for cutting the negative electrode active substance provided area A1 (see dotted lines $L_{N1}$). By doing this, it is possible to suppress the melt metal from contaminating the negative electrode active substance layer 24 and thus to suppress the adhesive property of the negative electrode active substance layer 24 from being reduced, and therefore it is possible to inhibit the broken piece of the negative electrode active substance layer 24 from falling off and being peeled off from the negative electrode plate 20 that has been already manufactured. On the other hand, in the manufacturing method according to the present embodiment, the pulse laser is used even for cutting the negative electrode substrate exposed area A2 so as to continuously cut the negative electrode active substance provided area A1 and the negative electrode substrate exposed area A2. By doing this, it is possible to inhibit the drastic reduction in the manufacture efficiency and the occurrence of the cut failure which are caused by switching the type of laser. Then, the present embodiment performs control to make the frequency of the pulse laser for cutting the negative electrode substrate exposed area A2 be larger than the pulse laser for cutting the negative electrode active substance provided area A1, and additionally make the lap rate of the pulse laser in the substrate exposed area cutting step S3 be equal to or more than 90%. By doing this, it is possible to make the impact at the time of laser cut be smaller and additionally make the melt amount of the electrode substrate at the time of this laser cut be enhanced to an extent similar to the CW laser, and thus it is possible to suppress the scatter of the sputter at the time of cutting the negative electrode substrate exposed area A2. As just described above, in accordance with the present embodiment, it is possible to inhibit the electrically conductive foreign substance from falling off and being peeled off from the negative electrode plate 20 that has been already manufactured, so as to contribute in improving the safety property of the secondary battery.

<Negative Electrode Plate>

Next, as for an example of the electrode plate manufactured with the manufacturing method of the electrode plate herein disclosed, a negative electrode plate for lithium ion secondary battery will be explained.

(Overview of Negative Electrode Plate)

Firstly, as just shown in FIG. 2, the negative electrode plate 20 in accordance with the present embodiment includes the negative electrode substrate 22 and the negative electrode active substance layer 24. In addition, this negative electrode plate 20 includes the electrode plate main body part 20b that is an area in which the negative electrode active substance layer 24 is provided on the surface of the negative electrode substrate 22 and includes the negative electrode tab 22t that is an area in which the negative electrode active substance layer 24 fails to be provided and thus the negative electrode substrate 22 is exposed. These things are already explained, and thus the overlapped explanation is omitted.

(First Thick Part)

Figure 15:
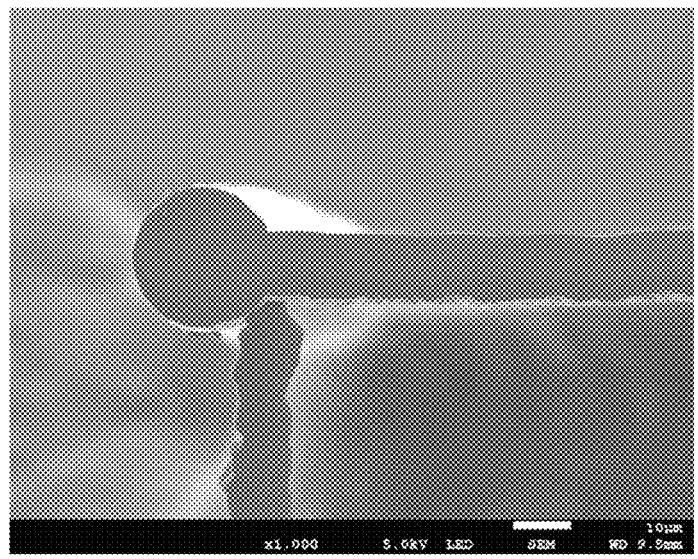
FIG. 15 is a cross section SEM photograph (1000 times) of a negative electrode tab of a negative electrode plate of Example 1.

Then, as shown in FIG. 5, the negative electrode plate 20 in accordance with the present embodiment includes a first thick part 23 which is formed at the outer circumferential edge part 22t1 of the negative electrode tab 22t and whose thickness is larger than the central part 22t2 of the negative electrode tab 22t. This first thick part 23 is a trace of the laser cut performed in the above described substrate exposed area cutting step S3. Particularly, in the manufacturing method of the electrode plate in accordance with the present embodiment, as just described above, the state of the pulse laser for cutting the negative electrode substrate exposed area A2 (see FIG. 3) is made to approximate the CW laser in order to suppress the scattering of the sputter. At the outer circumferential edge part 22t1 of the negative electrode tab 22t having been cut by the pulse laser as described above, the first thick part 23 can be formed which is a trace caused by melt cutting on the metal foil and whose cross section is close to a round shape, similarly to the case where the CW laser is used to cut. Incidentally, the phrase "whose cross section is close to a round shape" here means that the aspect ratio of the first thick part 23 for the cross section along the thickness direction T of the negative electrode tab 22t as shown in FIG. 5 is close to 1 (for example, equal to or more than 0.8, or typically, equal to or more than 0.85). The aspect ratio of the first thick part 23 as described above is calculated on the basis of a cross section photograph of the electrode tab (see FIG. 15) obtained by the scanning electron microscope (SEM). A particular calculating means for the aspect ratio of the first thick part 23 is just described below. At first, a cross section photograph of the negative electrode tab as shown in FIG. 15 is obtained. Next, on this cross section photograph, the first thick part is surrounded with a square having two sides along the surface of the negative electrode substrate. Then, short-side and long-side of the rectangle surrounding this first thick part are measured and then a value obtained with dividing the short-side by the long-side (short-side/long-side) is treated as the aspect ratio. Incidentally, the wording "aspect ratio" in the present specification is an average value of the aspect ratios of the first thick part confirmed with a plurality of points of view (typically, one or more points of view). Incidentally, the cross sectional shape of the first thick part is not restricted to either the round or the oval, and thus the cross sectional shape might partially include a lack or a distortion. Even for the first thick part including the lack or the distortion as described above, the aspect ratio can be calculated according to the above described procedure.

Incidentally, in the case where the cross sectional shape of the first thick part 23 becomes closer to the round shape, it is possible to inhibit another member from being damaged when said another member (for example, separator 30 shown in FIG. 13) comes into contact with the outer circumferential edge part 22t1 of the negative electrode tab 22t. Thus, regarding the aspect ratio of the first thick part 23, 0.88 or more is preferable, and 0.90 or more is further preferable. On the other hand, the upper limit of the aspect ratio of the first thick part 23 is not particularly restricted, and thus the upper limit might be equal to or less than 1.00. In addition, it is enough that the first thick part 23 is thicker than the central part 22t2 of the negative electrode tab 22t, and the particular thickness is not especially restricted. For example, the rate (t1/t2) of the thickness t1 of the first thick part 23 with respect to the thickness t2 of the central part 22t2 might be equal to or more than 1.1, might be equal to or more than 1.2, might be equal to or more than 1.4, or might be equal to or more than 1.5. On the other hand, the upper limit of the above described t1/t2 might be equal to or less than 7, might be equal to or less than 6, might be equal to or less than 5, or equal to or less than 3.

In addition, the manufacturing method of the electrode plate in accordance with the present embodiment controls to make the lap rate of the pulse laser for cutting the negative electrode substrate exposed area A2 (see FIG. 3) become equal to or more than 90%, as described above. If melt cutting is performed on the negative electrode substrate exposed area A2 with the pulse laser at the high lap rate as described above, the melted electrode substrate is deformed into an approximately spherical shape by the surface tension, and thus a melt metal dense portion and a melt metal sparse portion are alternately formed. Therefore, it is probable that the first area whose thickness is relatively large and the second area whose thickness is relatively small are alternately formed at the outer circumferential edge part 22t1 of the negative electrode tab 22t of the negative electrode plate 20 in accordance with the present embodiment.

Additionally, in the case where the pulse laser is used to cut the negative electrode substrate exposed area A2, it is possible to cut off the negative electrode tab 22t and the negative electrode substrate exposed area A2 at just the time of having irradiated the laser, and thus it is not required to perform a processing for peeling off the negative electrode tab 22t from the negative electrode substrate exposed area A2 as in the case where the CW laser is used. As the result, on the negative electrode plate 20 that has been already manufactured, it tends to arrange the center point C of the first thick part 23 between a pair of extended lines E1, E2 extending from respective surfaces (upper surface and lower surface) of the central part 22t2 of the negative electrode tab 22t, which is different from the cut trace formed by the CW laser (see FIG. 19). In the case where the center point C of the first thick part 23 is arranged at the vicinity of the center in the thickness direction of the negative electrode tab 22t as described above, the bending process of the negative electrode tab 22t becomes easy, and thus it is possible to contribute in enhancing the manufacture efficiency of the secondary battery.

(Second Thick Part)

On the other hand, as shown in FIG. 6, in the present embodiment, the second thick part 25 whose thickness is larger than the negative electrode substrate 22 at the central part 20b2 of the electrode plate main body part 20b is formed at the end part of the negative electrode substrate 22 on the outer circumferential edge part 20b1 of the electrode plate main body part 20b. The second thick part 25 as described above is a trace mark induced by irradiating the pulse laser on the negative electrode active substance provided area A1 of the negative electrode precursor 20A in the above described active substance provided area cutting step S2. This second thick part 25 is formed by cutting the negative electrode substrate 22 with the high energy pulse laser. In addition, a coating layer 25b sticks on the surface of the second thick part 25. This coating layer 25b is the negative electrode active substance layer 24 after the pulse laser is irradiated, and contains a negative electrode active substance. In addition, the negative electrode active substance layer 24 might contain a sintered substance of the negative electrode active substance, or the like. Then, as shown in FIG. 6, the thickness of the coating layer 25b is thinner than the thickness of the negative electrode active substance layer 24. The coating layer 25b as described above has the closely bonded property with respect to the surface of the negative electrode substrate 22 (second thick part 25), the closely bonded property is better in comparison with the negative electrode active substance layer in which the melt metal is contaminated, and thus it is possible to suitably inhibit the electrically conductive foreign substance from being peeled off and falling off. Incidentally, it is enough for the second thick part 25 and the coating layer 25b described above to be formed on at least one side of the outer circumferential edge part (see FIG. 2) of the electrode plate main body part 20b. Particularly, in the present embodiment, the outer circumferential edge part 20b1 of the electrode plate main body part 20b positioned on the negative electrode tabs 22t is cut by the pulse laser, and thus the second thick part 25 and the coating layer 25b are formed in the area on this negative electrode tab 22t.

In addition, the second thick part 25 has a claw hook shape that includes a shade part 25a1 protruding towards the both sides or one side of the thickness direction T of the negative electrode substrate 22 and that includes a recessed part 25a2 formed between the shade part 25a1 and the negative electrode substrate 22. The second thick part 25 is, different from the above described first thick part 23, formed by the pulse laser whose output is large, thus the melt amount of the negative electrode substrate 22 is small, and therefore the second thick part can have the claw hook shape as described above. Into the inside of the recessed part 25a2 of the second thick part 25 formed in the claw hook shape as described above, the coating layer 25b is entered. By doing this, the outstanding anchor effect is provided, thus the coating layer 25b is held further firmly, and therefore it is possible to furthermore suitably inhibit the broken piece of the negative electrode active substance layer 24 from falling off and being peeled off. Incidentally, the event that the second thick part 25 having such a claw hook shape is formed can cause damage on another member (e.g., separator of the secondary battery). However, in the present embodiment, the second thick part 25 is covered by the coating layer 25b, and thus it is possible to suitably inhibit the second thick part 25 having the claw hook shape from causing damages on another member. Incidentally, regarding the thickness of the coating layer 25b having stuck on the surface of the second thick part 25, from the perspective of suitably inhibiting the second thick part 25 from causing damages on another member, 1 µm or more is preferable, 2.5 µm or more is further preferable, and 5 µm or more is furthermore preferable. On the other hand, the upper limit of the thickness of the coating layer 25b is not particularly restricted, and it might be equal to or less than 20 µm, equal to or less than 17.5 µm, or equal to or less than 15 µm.

Incidentally, regarding the thickness of the shade part 25a1 of the above described second thick part 25, 1 µm or more is preferable, 2.5 µm or more is further preferable, and 4 m or more is furthermore preferable. By doing this, it is possible to provide the more suitable anchor effect. Incidentally, the above described "thickness of the shade part" is a thickness at the one side of the shade part 25a1 on the basis of the substrate surface being as the reference. In addition, regarding the upper limit value of the thickness of the shade part 25a1, from the perspective of more surely inhibiting the damage on another member, 30 µm or less is preferable, 25 µm or less is further preferable, and 20 µm or less is furthermore preferable. On the other hand, the width of the shade part 25a1 (size of the negative electrode plate in the short-transverse direction S) is not particularly restricted. For example, the width of the shade part 25a1 might be 1 µm to 30 µm, might be 5 µm to 25 µm, or might be 10 µm to 20 µm. Furthermore, regarding the height of the inlet of the recessed part 25a2 of the second thick part 25 (size in the thickness direction T), 1 µm to 10 µm is preferable, and 2.5 µm to 7.5 µm is further preferable. On the other hand, regarding the depth of the recessed part 25a2 of the second thick part 25 (size of the negative electrode plate in the short-transverse direction S), 0.1 to 10 µm is preferable, and 2.5 µm to 7.5 µm is further preferable. By doing this, it is possible to hold an appropriate amount of the coating layer 25b inside the recessed part 25a2 so as to be capable of providing the more suitable anchor effect. In addition, regarding the angle of the shade part 25a1 rising from the surface of the negative electrode substrate 22, more than 0° but equal to or less than 900 is preferable.

In addition, the aspect ratio of the second thick part 25 can be a value smaller than the aspect ratio of the first thick part 23. As described above, the second thick part 25 is a cut trace formed by the high energy pulse laser, and thus it is hard to make the cross sectional shape be an approximately round, which is different from the first thick part 23. Particularly, the upper limit value of the aspect ratio of the second thick part 25 can be equal to or less than 0.85 (typically, equal to or less than 0.82, or for example, equal to or less than 0.80). On the other hand, the lower limit value of the aspect ratio of the second thick part 25 can be equal to or more than 0.40 (typically, equal to or more than 0.45, or for example, equal to or more than 0.50). Incidentally, the aspect ratio of the second thick part can be measured according to a procedure similar for the aspect ratio of the first thick part as described above.

<Secondary Battery>

Figure 7:
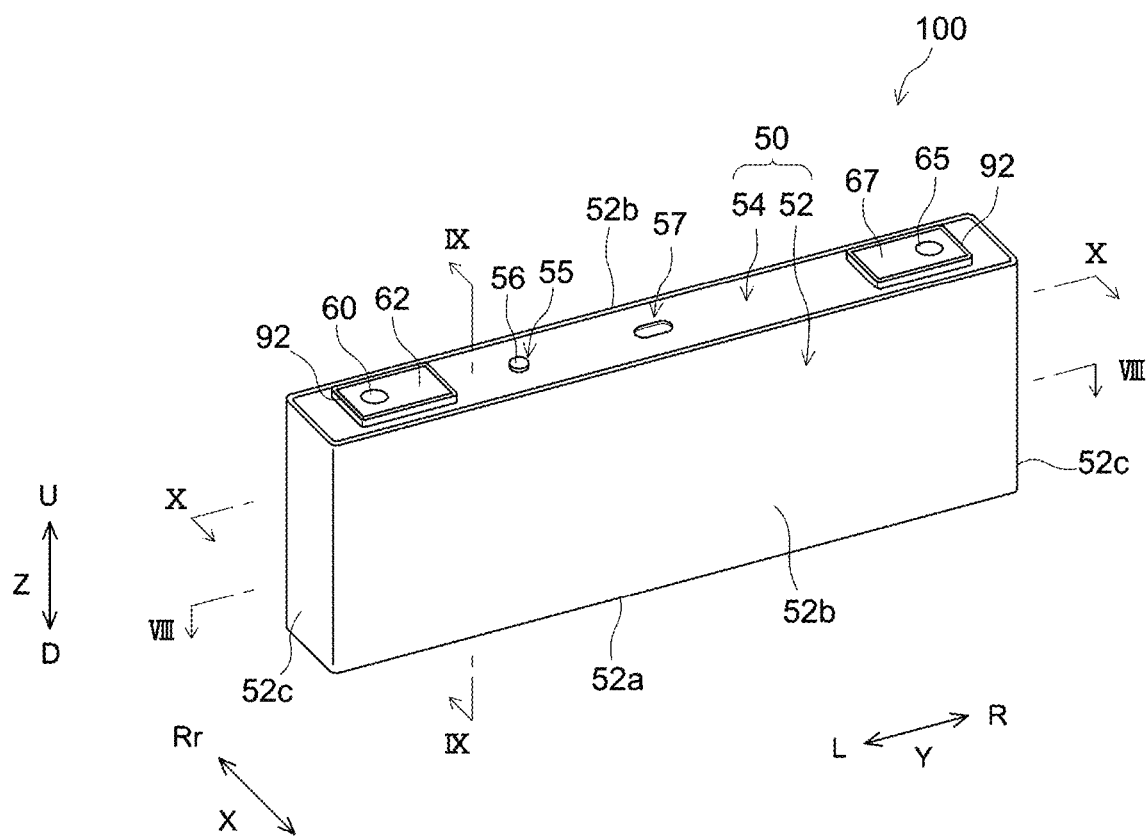
FIG. 7 is a perspective view that schematically shows a secondary battery in accordance with one embodiment.
Figure 8:
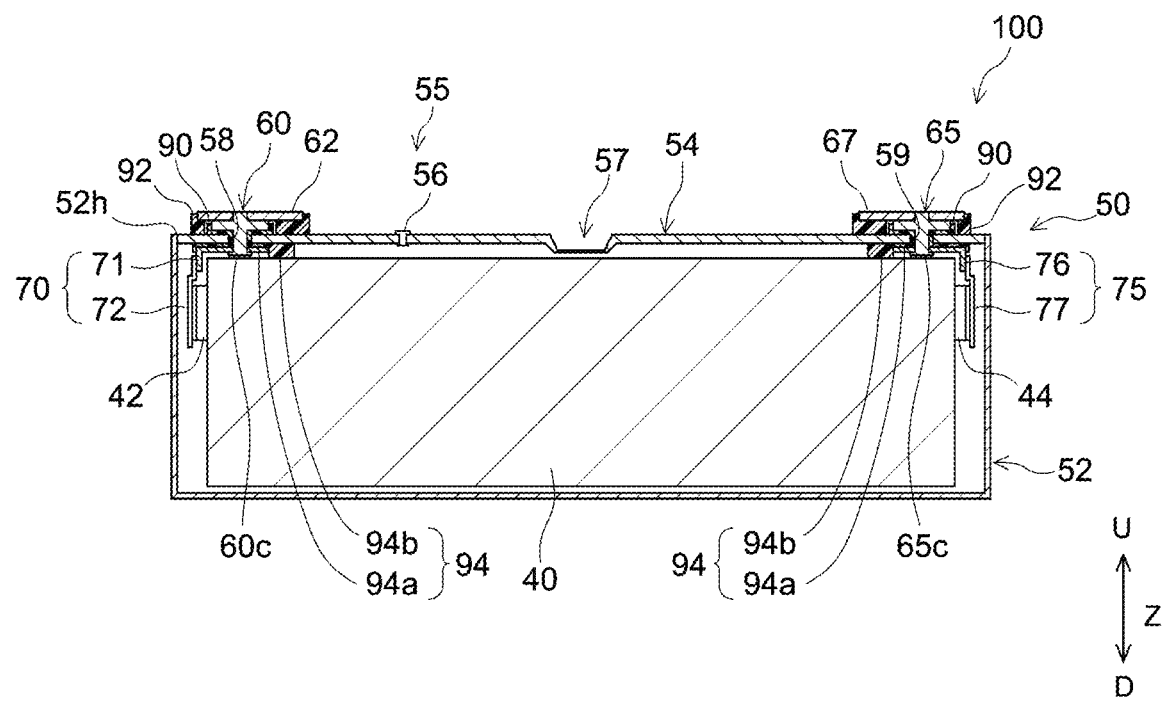
FIG. 8 is a longitudinal cross section view that is schematically shown along the VIII-VIII line of FIG. 7.
Figure 9:
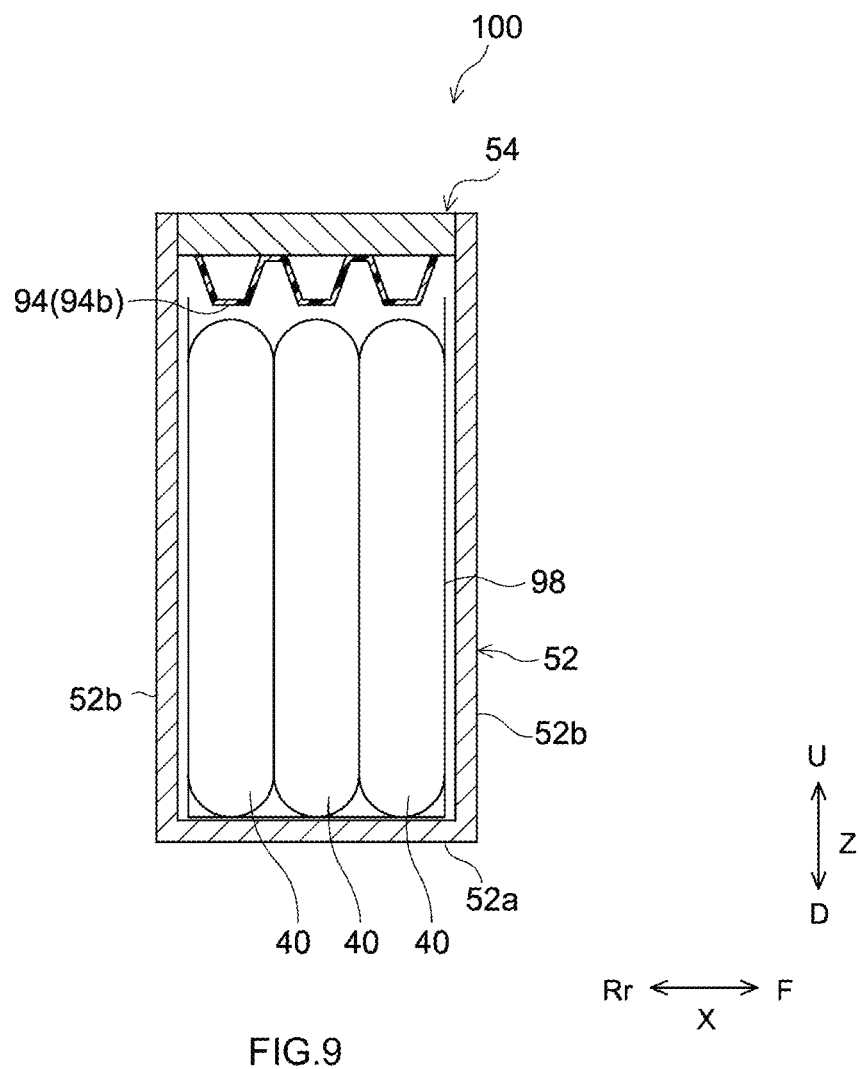
FIG. 9 is a longitudinal cross section view that is schematically shown along the IX-IX line of FIG. 7.
Figure 10:
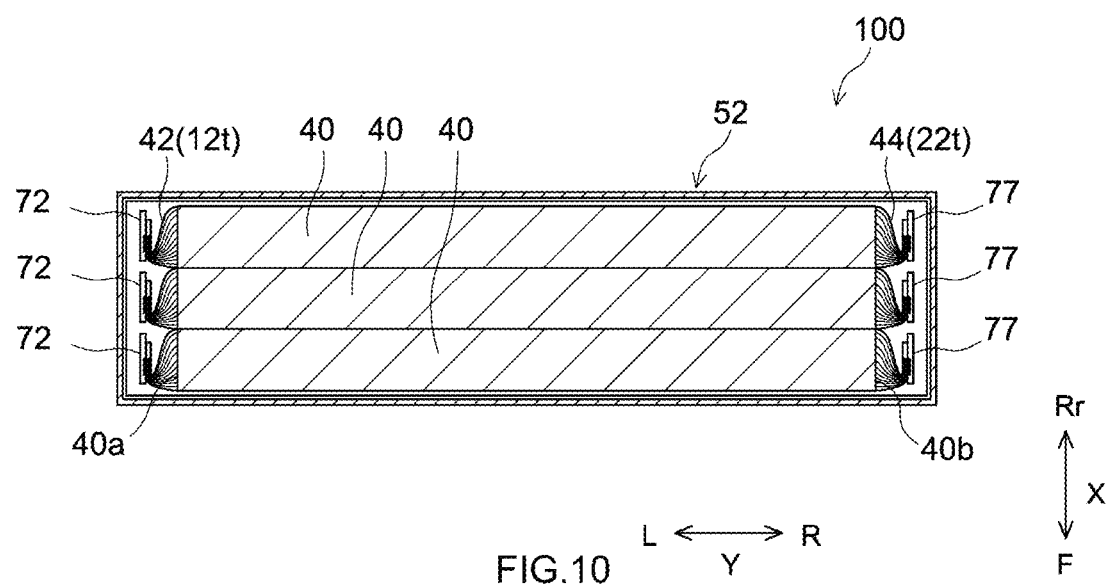
FIG. 10 is a lateral cross section view that is schematically shown along the X-X line of FIG. 7.
Figure 11:
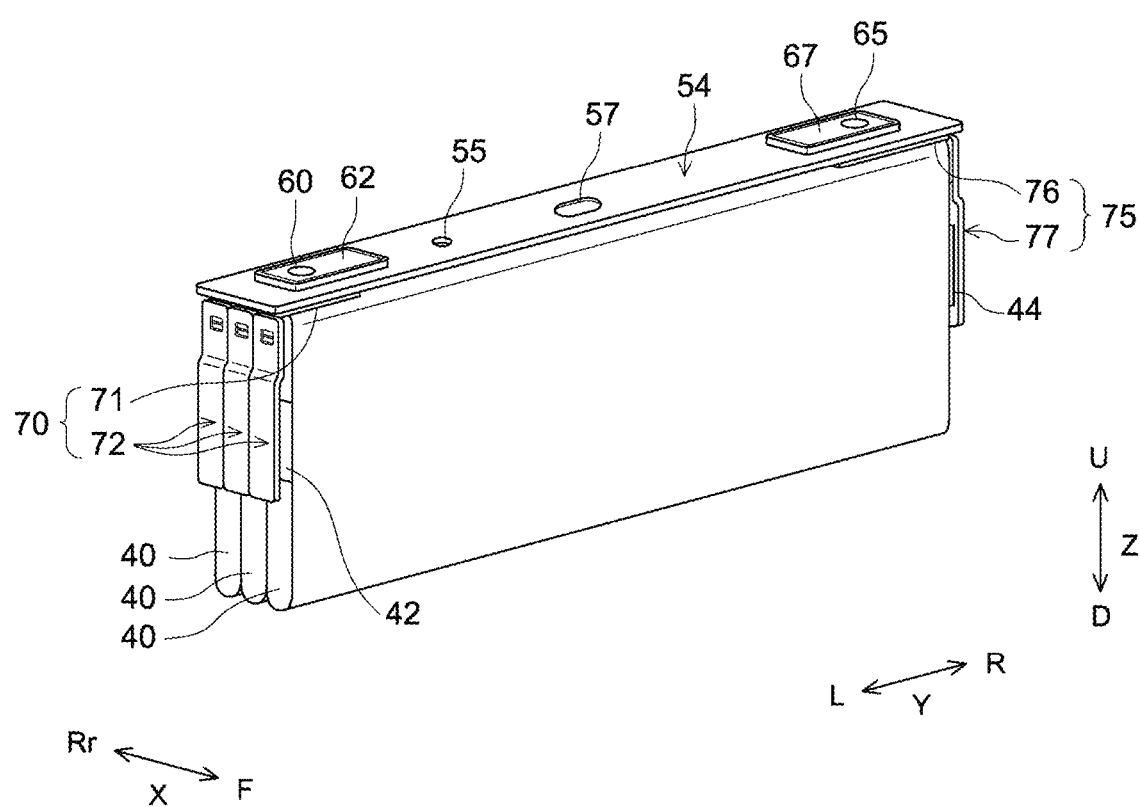
FIG. 11 is a perspective view that schematically shows an electrode body attached to a sealing plate.
Figure 12:
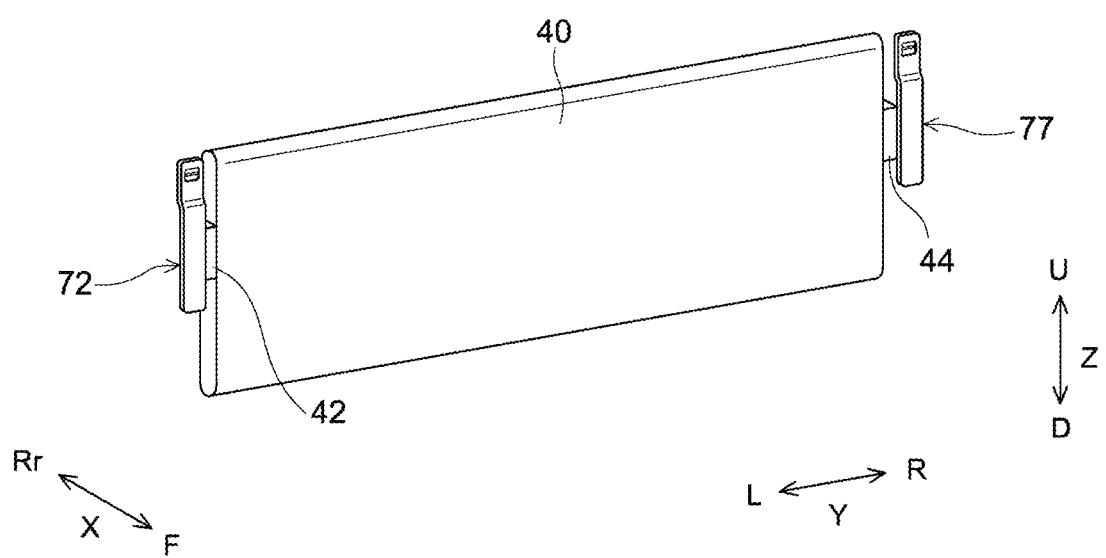
FIG. 12 is a perspective view that schematically shows the electrode body attached to a second positive electrode collecting member and a second negative electrode collecting member.
Figure 13:
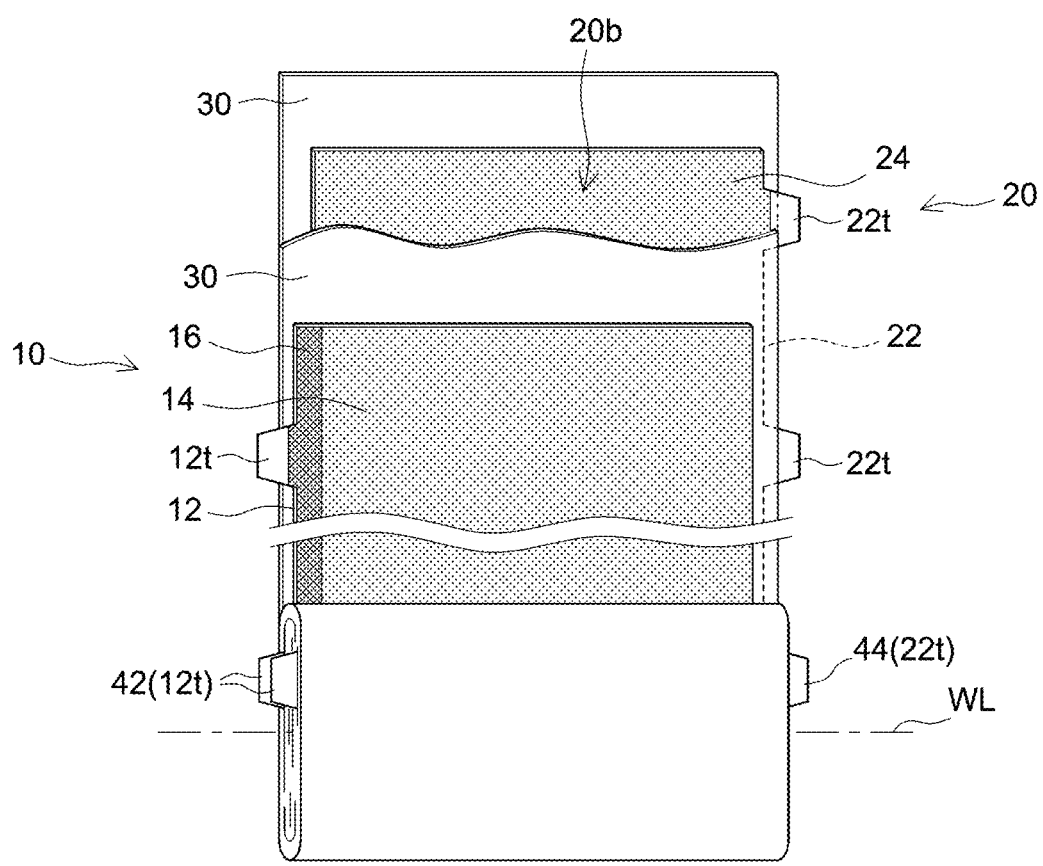
FIG. 13 is a perspective view for explaining the electrode body of the secondary battery in accordance with one embodiment.
Figure 14:
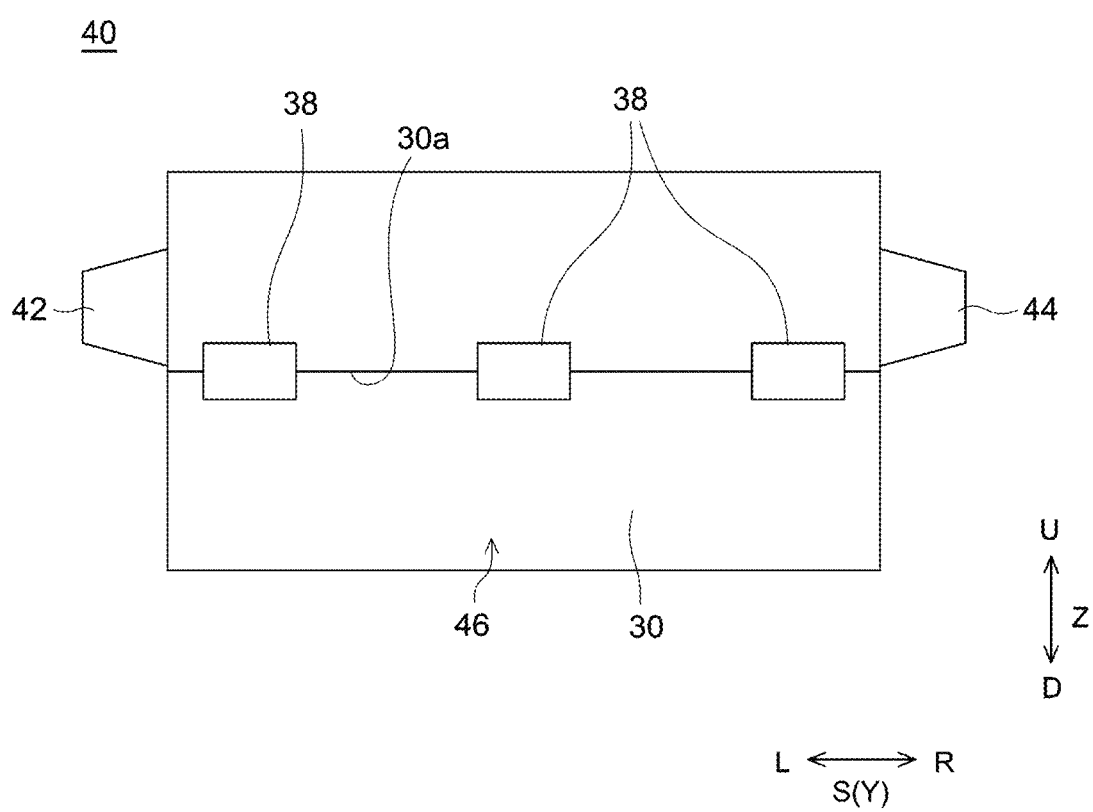
FIG. 14 is a front view that shows the electrode body of the secondary battery in accordance with one embodiment.

Next, the secondary battery will be described that is manufactured with the negative electrode plate 20 in accordance with the present embodiment. FIG. 7 is a perspective view that schematically shows the secondary battery in accordance with the present embodiment. FIG. 8 is a longitudinal cross section view that is schematically shown along the VIII-VIII line of FIG. 7. FIG. 9 is a longitudinal cross section view that is schematically shown along the IX-IX line of FIG. 7. FIG. 10 is a lateral cross section view that is schematically shown along the X-X line of FIG. 7. FIG. 11 is a perspective view that schematically shows the electrode body attached to a sealing plate. FIG. 12 is a perspective view that schematically shows the electrode body attached to a second positive electrode collecting member and a second negative electrode collecting member. FIG. 13 is a perspective view for explaining the electrode body of the secondary battery in accordance with the present embodiment. FIG. 14 is a front view that shows the electrode body of the secondary battery in accordance with the present embodiment. Incidentally, the reference sign X in FIGS. 7 to 14 represents the "thickness direction" of the secondary battery 100, the reference sign Y represents the "width direction", and the reference sign Z represents the "vertical direction". Additionally, in the thickness direction X, F represents the "front" and Rr represents the "rear". In the width direction Y, L represents the "left" and R represents the "right". Then, in the vertical direction Z, U represents the "up" and D represents the "down". However, these directions are defined for convenience sake of explanation, and are not intended to restrict the disposed form of the secondary battery 100.

As shown in FIGS. 7 to 10, this secondary battery 100 includes a wound electrode assembly 40, a battery case 50, a positive electrode terminal 60, a negative electrode terminal 65, a positive electrode collecting member 70, and a negative electrode collecting member 75. In addition, as not shown in figures, not only the wound electrode assembly 40 but also a nonaqueous electrolyte is accommodated in the battery case 50 of this secondary battery 100. This nonaqueous electrolyte is prepared by dissolving a supporting salt in a nonaqueous type solvent. As one example of the nonaqueous type solvent, it is possible to use a carbonate type solvent, such as ethylene carbonate, dimethyl carbonate, and ethyl methyl carbonate. As one example of the supporting salt, it is possible to use a fluorine containing lithium salt, such as LiPF6.

(Battery Case)

The battery case 50 is a housing that accommodates the wound electrode assembly 40. The battery case 50 here has an outer shape that is a flat and bottomed rectangular parallelopiped shape (square shape). It is enough for the material of the battery case 50 to use a material the same as the conventionally used one, and the material is not particularly restricted. It is preferable that the battery case 50 is made of metal, and it is further preferable that the battery case is made of, for example, aluminum, aluminum alloy, iron, iron alloy, or the like. The battery case 50 includes an outer package 52 and a sealing plate 54.

The outer package 52 is a container formed in a flat and bottomed square shape that includes an opening 52h at the upper surface. As shown in FIG. 7, the outer package 52 includes a bottom wall 52a formed in a flat surface approximately rectangular shape, a pair of long side walls 52b extending from the long side of the bottom wall 52a in the vertical direction Z, and a pair of short side walls 52c extending from the short side of the bottom wall 52a in the vertical direction Z. On the other hand, the sealing plate 54 is a plate-shaped member formed in a flat surface approximately rectangular shape that covers the opening 52h of the outer package 52. Then, the outer circumferential edge part of the sealing plate 54 is joined (e.g., by welding) to the outer circumferential edge part of the opening 52h of the outer package 52. By doing this, the battery case 50 whose inside is airtightly sealed (airtightly closed) is manufactured. In addition, the sealing plate 54 is provided with a liquid injection hole 55 and with a gas exhaust valve 57. The liquid injection hole 55 is provided for performing liquid injection of the nonaqueous electrolyte into the battery case 50 to which the outer package 52 and the sealing plate 54 have been already joined. Incidentally, the liquid injection hole 55 is sealed by the seal member 56 after the liquid injection of the nonaqueous electrolyte is performed. In addition, the gas exhaust valve 57 is a thin-walled part that is designed to be broken (opened) by a predetermined pressure so as to exhaust gas inside the battery case 50 when a large amount of gas generate inside the battery case 50.

(Electrode Terminal)

In addition, the positive electrode terminal 60 is attached to one end part (left side in FIG. 7 and FIG. 8) of the sealing plate 54 in the long side direction Y of the secondary battery 100. The positive electrode terminal 60 as described above is connected to a plate-shaped positive electrode outside electrically conductive member 62 at a position outside the battery case 50. On the other hand, the negative electrode terminal 65 is attached to the other end part (right side in FIG. 7 and FIG. 8) of the sealing plate 54 in the long side direction Y of the secondary battery 100. Even to the negative electrode terminal 65 as described above, a plate-shaped negative electrode outside electrically conductive member 67 is attached. These outside electrically conductive members (positive electrode outside electrically conductive member 62 and negative electrode outside electrically conductive member 67) are connected to other secondary battery or outside equipment through an outside connecting member (bus bar, or the like). Incidentally, it is preferable that the outside electrically conductive member is configured with a metal having an outstanding electrically conductive property (aluminum, aluminum alloy, copper, copper alloy, or the like).

(Electrode Collecting Member)

The secondary battery 100 accommodates a plurality of (3 in figures) wound electrode bodies 40 inside the battery case 50. The positive electrode terminal 60 is connected to each of the plurality of wound electrode bodies 40 through the positive electrode collecting member 70 accommodated in the battery case 50. In particular, the positive electrode collecting member 70 connecting the positive electrode terminal 60 and the wound electrode assembly 40 is accommodated in the battery case 50. As shown in FIGS. 8 and 11, the positive electrode collecting member 70 includes a first positive electrode collecting member 71 that is a plate-shaped electrically conductive member extending along the inside surface of the sealing plate 54, and includes a plurality of second positive electrode collecting members 72 that are plate-shaped electrically conductive members extending along the vertical direction Z. Then, the bottom end part 60c of the positive electrode terminal 60 extends toward the inside of the battery case 50 through the terminal insertion hole 58 of the sealing plate 54, and is connected to the first positive electrode collecting member 71 (see FIG. 8). As shown in FIGS. 11 and 12, the second positive electrode collecting member 72 is connected to a positive electrode tab group 42 of each of a plurality of wound electrode bodies 40. Then, as shown in FIG. 10, the positive electrode tab group 42 of the wound electrode assembly 40 is folded and bended so as to arrange the second positive electrode collecting member 72 and the one side surface 40a of the wound electrode assembly 40 opposed to each other. By doing this, the top end part of the second positive electrode collecting member 72 and the first positive electrode collecting member 71 are electrically connected.

On the other hand, the negative electrode terminal 65 is connected to each of the plurality of wound electrode bodies 40 through a negative electrode collecting member 75 accommodated in the battery case 50. The connection structure at the negative electrode side is approximately the same as the connection structure of the positive electrode side described above. Particularly, the negative electrode collecting member 75 includes a first negative electrode collecting member 76 that is a plate-shaped electrically conductive member extending along the inside surface of the sealing plate 54, and includes a plurality of second negative electrode collecting members 77 that are plate-shaped electrically conductive members extending along the vertical direction Z. Then, the bottom end part 65c of the negative electrode terminal 65 extends toward the inside of the battery case 50 through the terminal insertion hole 59 so as to be connected to the first negative electrode collecting member 76 (see FIG. 8). The second negative electrode collecting member 77 is connected to a negative electrode tab group 44 of each of the plurality of wound electrode bodies 40 (see FIGS. 11 and 12). Then, the negative electrode tab group 44 is folded and bended so as to arrange the second negative electrode collecting member 77 and the other side surface 40b of the wound electrode assembly 40 opposed to each other (see FIG. 10). By doing this, the top end part of the second negative electrode collecting member 77 and the first negative electrode collecting member 76 are electrically connected.

(Insulation member)

In addition, the secondary battery 100 in accordance with the present embodiment is provided with various insulation members attached for inhibiting the conduction between the wound electrode assembly 40 and the battery case 50. Particularly, an outside insulation member 92 is disposed between the positive electrode outside electrically conductive member 62 (negative electrode outside electrically conductive member 67) and the outside surface of the sealing plate 54 (see FIG. 7). By doing this, it is possible to inhibit the positive electrode outside electrically conductive member 62 and the negative electrode outside electrically conductive member 67 from being conducted to the sealing plate 54. In addition, a gasket 90 is attached to each of the terminal insertion holes 58, 59 of the sealing plate 54 (see FIG. 8). By doing this, it is possible to inhibit the positive electrode terminal 60 (or the negative electrode terminal 65) inserted into the terminal insertion holes 58, 59 from being conducted to the sealing plate 54. In addition, an inside insulation member 94 is arranged between the first positive electrode collecting member 71 (or the first negative electrode collecting member 76) and the inside surface of the sealing plate 54. This inside insulation member 94 includes a plate-shaped base part 94a disposed between the first positive electrode collecting member 71 (or the first negative electrode collecting member 76) and the inside surface of the sealing plate 54. By doing this, it is possible to inhibit the first positive electrode collecting member 71 and the first negative electrode collecting member 76 from being conducted to the sealing plate 54. Further, the inside insulation member 94 includes a protruding part 94b that protrudes toward the wound electrode assembly 40 from the inside surface of the sealing plate 54. By doing this, it is possible to regulate movement of the wound electrode assembly 40 in the vertical direction Z so as to inhibit the direct contact of the wound electrode assembly 40 and the sealing plate 54. Furthermore, the wound electrode assembly 40 is accommodated in the battery case 50 in a state of being covered by an electrode body holder 98 consisted of a resin sheet having an insulating property (see FIG. 9). By doing this, it is possible to inhibit the direct contact of the wound electrode assembly 40 and the outer package 52. Incidentally, the material of each insulation member described above is not particularly restricted, if having a predetermined insulating property. As one example, it is possible to use a synthetic resin material, such as polyolefin type resin (for example, polypropylene (PP), and polyethylene (PE)), and fluorine type resin (for example, perfluoro alkoxy alkane (PFA), and polytetrafluoroethylene (PTFE)).

(Wound Electrode Assembly)

Next, the electrode body will be described that is used for the secondary battery 100 in accordance with the present embodiment. The present embodiment uses the wound electrode assembly 40, as the electrode body, whose configuration is shown in FIG. 13. The wound electrode assembly 40 includes a pair of electrode plates (positive electrode plate 10 and negative electrode plate 20) that are wound therein in a state of being opposed to each other through a separator 30. For manufacturing this wound electrode assembly 40, firstly, a laminated body is formed in which the long strip-like shaped positive electrode plate 10 and the long strip-like shaped negative electrode plate 20 are laminated while the long strip-like shaped separator 30 is disposed between them. Then, after this laminated body is wound along the longitudinal direction, a winding stop tape 38 (see FIG. 14) is attached to the terminal end part 30a of the separator 30 arranged at the outermost circumference. By doing this, it is possible to manufacture the wound electrode assembly 40. Then, the present embodiment uses the negative electrode plate 20 having the above described structure, for manufacturing this wound electrode assembly 40. Below, the wound electrode assembly 40 in the present embodiment will be described.

Firstly, the separator 30 is a sheet-shaped member including a function of not only inhibiting the contact of the positive electrode plate 10 and the negative electrode plate 20 but also passing the electric charge carrier. As for one example of the separator 30 as described above, it is possible to use a resin sheet on which a plurality of fine holes capable of passing electric charge carriers are formed. It is preferable that the resin sheet as described above includes a resin layer consisted of polyolefin resin (for example, polyethylene (PE) and polypropylene (PP)). In addition, on the surface of the above described resin sheet, a heat resistant layer might be formed that contains an inorganic filler, such as alumina, boehmite, water oxidation aluminum, and titania.

The positive electrode plate 10 includes a positive electrode substrate 12 that is a foil-shaped metal member, a positive electrode active substance layer 14 that is provided on the surface of the positive electrode substrate 12, and a protective layer 16 that is provided on the surface of the positive electrode substrate 12 to be adjacent to the side edge part 10a of the positive electrode plate 10. Furthermore, on the side edge part 10a of the positive electrode plate 10, a plurality of positive electrode tabs 12t protruding toward the outside in the short-transverse direction S (left side in FIG. 13) are provided at predetermined intervals in the longitudinal direction L of the positive electrode plate 10. This positive electrode tab 12t is an area on which neither the positive electrode active substance layer 14 nor the protective layer 16 is provided and the positive electrode substrate 12 is exposed. Incidentally, it is preferable from the perspective of the battery performance that the positive electrode active substance layer 14 and the protective layer 16 are provided on the both surfaces of the positive electrode substrate 12. In addition, the protective layer 16 might be provided to make one part of it cover the side edge part of the positive electrode active substance layer 14. Incidentally, regarding the material of each member (positive electrode substrate 12, positive electrode active substance layer 14, and protective layer 16) configuring the positive electrode plate 10, a conventionally well known material capable of being used in a general secondary battery (for example, lithium ion secondary battery) can be used without particular restriction, which does not restrict the herein disclosed technique, and thus detailed explanation for the material is omitted.

On the other hand, the configuration of the negative electrode plate 20 used for the secondary battery 100 in accordance with the present embodiment is as described above. Regarding the negative electrode plate 20 as described above, the pulse laser is used for cutting out the electrode plate main body part 20b from the negative electrode active substance provided area A1 of the negative electrode precursor 20A (see FIG. 3). Thus, in the negative electrode plate 20 according to the present embodiment, the reduction in the adhesive property of the negative electrode active substance layer 24 caused by the contamination of the melt metal is suppressed. As this result, it is possible to inhibit the situation where, after the secondary battery 100 is constructed, the broken piece of the negative electrode active substance layer 24 falls off or is peeled off so as to cause the internal short circuit. Furthermore, regarding this negative electrode plate 20, the pulse laser approximating the CW laser is used for cutting out the negative electrode tab 22t from the negative electrode substrate exposed area A2 of the negative electrode precursor 20A (see FIG. 3). Thus, in the negative electrode plate 20 according to the present embodiment, the stick of the fine metal piece (sputter) is suppressed. As this result, it is possible to inhibit the situation where, after the secondary battery 100 is constructed, the sputter falls off or is peeled off so as to cause the internal short circuit. In other words, the secondary battery 100 in accordance with the present embodiment inhibits the various electrically conductive foreign substances from falling off and being peeled off from the negative electrode plate 20, so as to have the high safety property.

Another Embodiment

Above, one embodiment of the herein disclosed technique is explained. Incidentally, the above described embodiment represents an example to which the herein disclosed technique is applied, and the above described embodiment does not restrict the herein disclosed technique.

For example, the negative electrode plate 20 including the first thick part 23 shown in FIG. 5 whose aspect ratio is equal to or more than 0.85 is an example of the electrode plate manufactured with the manufacturing method of the electrode plate herein disclosed, and is not intended to restrict the herein disclosed technique. In particular, the manufacturing method of the electrode plate herein disclosed makes the state of the pulse laser in the substrate exposed area cutting step be closer to the CW laser, to suppress the scatter of the sputter, so as to inhibit the electrically conductive foreign substance from falling off and being peeled off from the electrode plate that has been already manufactured. However, the shape of the laser cut trace (first thick part) can be changed according to the material or thickness of the electrode substrate being the cut object, and thus the aspect ratio of the first thick part might become less than 0.85, even in the case where the manufacturing method of the electrode plate herein disclosed has been applied and the scatter of the sputter has been properly suppressed. In other words, the manufacturing method of the electrode plate herein disclosed is a method of making the state of the pulse laser in the substrate exposed area cutting step be closer to the CW laser so as to decrease the generation amount of the sputter more than the conventional one, which is not restricted to a method of manufacturing a negative electrode plate including a first thick part whose aspect ratio is equal to or more than 0.85.

Additionally, in the above described embodiment, the negative electrode plate is treated as the manufacture target for the manufacturing method of the electrode plate herein disclosed. However, the manufacture target for the manufacturing method of the electrode plate herein disclosed is not restricted to the negative electrode plate, and the positive electrode plate might be treated as the manufacture target. Even in the case where the positive electrode plate is treated as the manufacture target while described above, it is possible to inhibit the electrically conductive foreign substance (broken piece of the positive electrode active substance layer or sputter) from falling off and being peeled off from the electrode plate (positive electrode plate) that has been already manufactured. Incidentally, the negative electrode plate having been manufactured in the above described embodiment tends to easily cause the reduction in the adhesive property of the electrode active substance layer due to the contamination of the melt metal, compared with the positive electrode plate. Whereas, by using the manufacturing method of the electrode plate herein disclosed, it is possible to properly suppress the contamination of the melt metal as described above. Thus, the manufacturing method of the electrode plate herein disclosed can be applied particularly in a suitable manner to the manufacture of the negative electrode plate.

In addition, the above described embodiment uses the wound electrode assembly as the electrode body. However, it is enough for the electrode body to make the positive electrode plate and the negative electrode plate be opposed to each other through the separator, and the electrode body is not restricted to the wound electrode assembly. As for another example of the structure of the electrode body, it is possible to use a laminate electrode body in which a plurality of positive electrode plates and negative electrode plates are sequentially laminated while separators are respectively disposed between them. In order to manufacture this kind of negative electrode plate for laminate electrode body, the cutting step along the short-transverse direction S as shown by the two-dot chain lines $L_{N4}$ in FIG. 3 might be performed for each one of the negative electrode tabs 22t. Although the detailed explanation is omitted, the manufacture of the positive electrode plate is also similarly performed. Then, for laminating the positive electrode tabs at the same position and for laminating the negative electrode tabs of the negative electrode plate at the same position, a plurality of positive electrode plates and a plurality of negative electrode plates are laminated while separators are respectively disposed between them. By doing this, it is possible to manufacture the laminate electrode body.

Additionally, the above described embodiment has the target set to be the high capacity secondary battery 100 accommodating three wound electrode bodies 40 inside the battery case 50. However, the number of the electrode body accommodated in one battery case is not particularly restricted, and the number might be equal to or more than 2 (plural), or might be 1. Furthermore, the secondary battery 100 in accordance with the above described embodiment is a lithium ion secondary battery in which the lithium ion is the electric charge carrier. However, the secondary battery herein disclosed is not restricted to the lithium ion secondary battery. Even in the manufacture step for the other secondary batteries (e.g., nickel hydrogen battery), there is a step for cutting the active substance provided area and substrate exposed area of the electrode precursor by the laser, and thus the herein disclosed technique can be applied without particular restriction.

In addition, the secondary battery 100 in accordance with the above described embodiment is a nonaqueous electrolyte secondary battery using a nonaqueous electrolyte as the electrolyte. However, the herein disclosed technique can be applied to a battery other than the nonaqueous electrolyte secondary battery. As for another example of the structure of the secondary battery, it is possible to use an all-solid battery. This all-solid battery is provided with a solid electrolyte layer configured with a solid electrolyte formed in a sheet shape, as the separator disposed between the positive electrode plate and the negative electrode plate. In this all-solid battery, the separator and the electrolyte are integrated and included inside the electrode body, and thus it is possible to inhibit the leak of the electrolyte or the like. Even in the manufacture step for this kind of the all-solid battery, there is a step for cutting the active substance provided area and substrate exposed area of the electrode precursor by the laser, and thus the herein disclosed technique can be applied without particular restriction.

TEST EXAMPLE

Below, a test example related to the present disclosure is explained. Incidentally, the content of the test example described below is not intended to restrict the present disclosure.

(1) Sample Preparation

Example 1

In Example 1, pulse lasers at different conditions were used for the negative electrode active substance provided area and for the substrate exposed area of the negative electrode precursor, so as to manufacture the negative electrode for lithium ion secondary battery. At first, a negative electrode precursor was prepared that was provided with a negative electrode active substance layer whose thickness was 80 μm on the both surfaces of the negative electrode substrate (copper foil) whose thickness was 8 μm. This negative electrode active substance layer of the negative electrode precursor contains a negative electrode active substance, a thickening agent, and a binder, and the rate of them is 98.3:0.7:1.0. Incidentally, graphite was used as for the negative electrode active substance, carboxy methyl cellulose (CMC) was used as for the thickening agent, and styrene butadiene rubber (SBR) was used as for the binder. Next, the negative electrode precursor was cut into a predetermined shape so as to cut out the negative electrode plate.

Particularly, for cutting the negative electrode active substance provided area in Example 1, a pulse laser was used whose pulse width was 240 ns, whose lap rate was 92%, and whose frequency was 400 kHz. On the other hand, for cutting the substrate exposed area, a pulse laser was used whose pulse width was 240 ns, whose lap rate was 90%, and whose frequency was 450 kHz. In addition, the spot diameter of the pulse laser was uniformed to be 30 μm.

Example 2 to Example 5

In Example 2 to Example 5, the negative electrode for lithium ion secondary battery was manufactured with a condition the same as the above described Example 1, other than the points of having made the lap rate and frequency of the pulse laser for cutting the substrate exposed area be different. Incidentally, the lap rate and frequency of the pulse laser in each example are shown in the later-described Table 1.

Example 6

In Example 6, the CW lasers having the same conditions were used for the negative electrode active substance provided area and for the substrate exposed area. Firstly, the negative electrode precursor prepared in Example 6 was the same as the negative electrode precursors prepared in Example 1 to Example 5. Then, in Example 6, the CW laser whose output was 1000 W and whose scanning speed was 6000 mm/sec was used to cut both of the negative electrode active substance provided area and the substrate exposed area. Incidentally, the spot diameter of the CW laser used in Example 6 was 20 μm.

2. Evaluation Test

Figure 16:
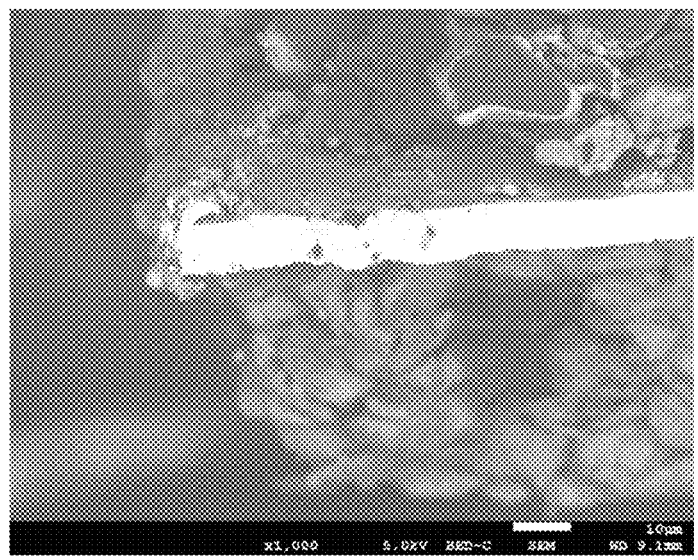
FIG. 16 is a cross section SEM photograph (1000 times) of the side edge part of the electrode plate main body part of the negative electrode plate of Example 1.
Figure 17:
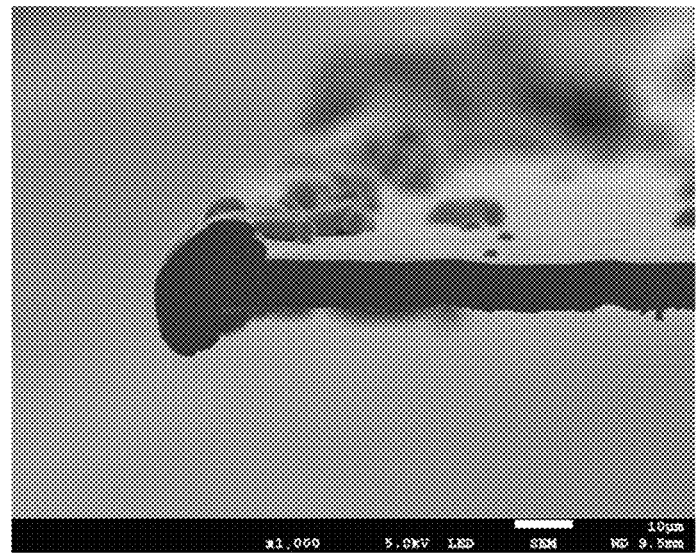
FIG. 17 is a cross section SEM photograph (1000 times) of the negative electrode tab of the negative electrode plate of Example 3.
Figure 18:
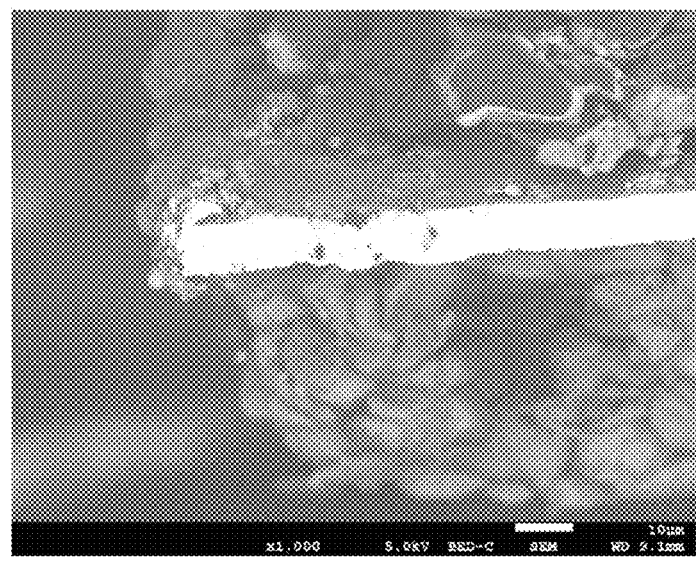
FIG. 18 is a cross section SEM photograph (1000 times) of the side edge part of the electrode plate main body part of the negative electrode plate of Example 3.
Figure 19:
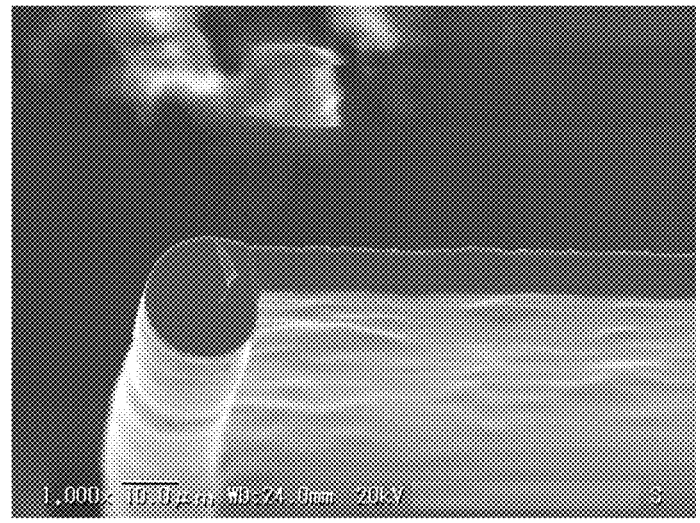
FIG. 19 is a cross section SEM photograph (1000 times) of the negative electrode tab of the negative electrode plate of Example 6.
Figure 20:
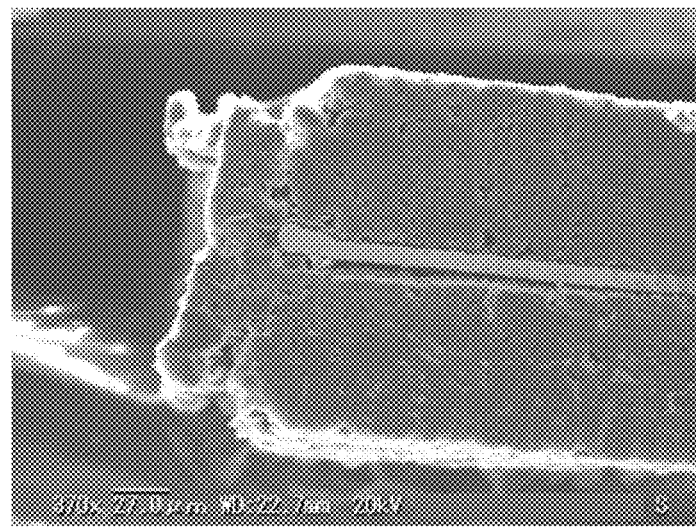
FIG. 20 is a cross section SEM photograph (370 times) of a side edge part of the electrode plate main body part of the negative electrode plate of Example 6.

In the present test, at first, the laser cut portion of the negative electrode plate manufactured in each example was observed with the scanning electron microscope (SEM). Incidentally, in the present test, the SEM observation was performed on two portions of the negative electrode plate of each example, which were the side edge part of the negative electrode tab and the side edge part of the electrode plate main body. FIG. 15 is a cross section SEM photograph (1000 times) of a negative electrode tab of Example 1. FIG. 16 is a cross section SEM photograph (1000 times) of the electrode plate main body part of Example 1. FIG. 17 is a cross section SEM photograph (1000 times) of the negative electrode tab of Example 3. FIG. 18 is a cross section SEM photograph (1000 times) of the electrode plate main body part of Example 3. FIG. 19 is a cross section SEM photograph (1000 times) of the negative electrode tab of Example 6. FIG. 20 is a cross section SEM photograph (370 times) of the electrode plate main body part of Example 6.

Next, regarding the negative electrode plate after the manufacture, the following points were evaluated on the basis of the above described cross section SEM photograph. At first, on the basis of the cross section SEM photograph of the negative electrode tab for each example, the aspect ratio of the laser cut trace (first thick part) was measured. Next, the state in the vicinity of the outer circumferential edge part of the negative electrode tab was confirmed, so as to evaluate the example, in which no sputter stuck, as "o" and evaluate the example, in which one or more sputter stuck, as "x". Then, the state of the side edge part of the electrode plate main body was confirmed, so as to evaluate the example, in which the negative electrode active substance layer contaminated with the melt metal did not occur, as "o" and evaluate the example, in which the negative electrode active substance layer contaminated with the melt metal occurred, as "x".

3. Evaluation Result

The results of the above described evaluation test are shown in the below described Table 1.

negative electrode tab (see FIG. 17). In addition, regarding the first thick part formed on the negative electrode tab of Example 3, the aspect ratio was smaller to be 0.82. While the illustration is omitted, Examples 4 and 5 also show the similar results, a large amount of sputters were sticking onto the negative electrode tab, and the aspect ratio of the first thick part was smaller. From these results, it was found that making the frequency of the pulse laser for cutting the substrate exposed area be larger and making the lap rate be equal to or more than 90% can make the state of the pulse laser approximate the CW laser so as to suppress the generation of the sputter.

In addition, regarding Example 6, the center of the first thick part whose cross section was approximately a round was deviated downward from the center in the thickness direction of the negative electrode substrate. It is estimated that this is caused because, regarding Example 6 using the CW laser, the negative electrode tab was not completely cut off from the substrate exposed area at the time immediately after the laser irradiation, it was required to make the negative electrode tab be peeled off from the substrate exposed area, and the laser cut trace (first thick part) was pulled by peeling off the negative electrode tab.

(2) Cut Result of Active Material Layer Provided Area

Next, the state in the vicinity of the side edge part of the electrode plate main body part of each example (that is to say, in the vicinity of the active material layer provided area on which the laser cut was performed) is compared and

TABLE 1

| | Frequency (kHz) | | Lap rate (%) | | Pulse width (ns) | | Output (W) | | Evaluation test | | |
|---|---|---|---|---|---|---|---|---|---|---|---|
| | Substrate exposed area | Active substance provided area | Substrate exposed area | Active substance provided area | Substrate exposed area | Active substance provided area | Substrate exposed area | Active substance provided area | Aspect ratio of negative electrode tab | Stick of sputter | Contamination of melt metal |
| Example 1 | 450 | 400 | 90 | 92 | 240 | 240 | 210 | 270 | 0.95 | o | o |
| Example 2 | 500 | 400 | 91 | 92 | 240 | 240 | 270 | 270 | 0.92 | o | o |
| Example 3 | 400 | 400 | 89 | 92 | 240 | 240 | 270 | 270 | 0.82 | x | o |
| Example 4 | 300 | 400 | 85 | 92 | 240 | 240 | 210 | 270 | 0.77 | x | o |
| Example 5 | 100 | 400 | 56 | 92 | 240 | 240 | 270 | 270 | 0.83 | x | o |
| Example 6 | | | CW laser | | | | 1000 | 1000 | 0.96 | o | x |

(1) Cut Result of Substrate Exposed Area

At first, the state in the vicinity of the outer circumferential edge part of the negative electrode tab of each example (that is to say, in the vicinity of the substrate exposed area on which the laser cut was performed) is compared and examined. Regarding Example 1, no stick of the metal piece (sputter) was observed in the vicinity of the outer circumferential edge part of the negative electrode tab (see FIG. 15). In addition, at this outer circumferential edge part of the negative electrode tab, a first thick part was formed whose thickness was larger than the central part of the negative electrode tab. It is estimated that the melt negative electrode substrate was solidified so as to be this first thick part. Then, the aspect ratio of the first thick part formed at the negative electrode tab of this Example 1 was 0.95. While the illustration is omitted, Example 2 and Example 6 also show the similar results as described above, the stick of the sputter onto the negative electrode tab was suppressed, and the first thick part whose aspect ratio was larger was formed. On the other hand, regarding Example 3, a large amount of sputters were confirmed that were sticking in the vicinity of the outer circumferential edge part of the examined. Firstly, as shown in FIG. 20, in Example 6 where the CW laser was used to cut the active material layer provided area, the negative electrode active substance layer contaminated with the melt metal was sticking at the side edge part of the electrode plate main body part after the cut. Then, it was found that this negative electrode active substance sticking at the side edge part of the electrode plate main body part easily fell off and was easily peeled off in response to a small impact. On the other hand, in Example 1 and Example 3, the contamination of the melt metal into the negative electrode active substance layer was not confirmed (see FIG. 16 and FIG. 18). Then, regarding Example 1 and Example 3, the second thick part, whose thickness was larger than the negative electrode substrate at the central part of the electrode plate main body part, was formed at the end part of the negative electrode substrate on the side edge part of the negative electrode plate main body part. In addition, the coating layer containing the negative electrode active substance was sticking on the surface of the second thick part. As the illustration is omitted, Example 2, Example 4, and Example 5 also show the similar results as described above. From the points described above, it was found that using the pulse laser for cutting the active material layer provided area can inhibit the melt metal from contaminating the negative electrode active substance layer.

Above, the present disclosure is explained in detail, but the above described explanation is merely an illustration. In other words, the herein disclosed technique includes contents in which the above described specific examples are variously deformed or changed.

What is claimed is:

1. A method for manufacturing an electrode plate that comprises an electrode substrate being a metal foil and an electrode active substance layer being provided on a surface of the electrode substrate and having an electrode active substance, the method comprising:
a precursor preparing step for preparing an electrode precursor that comprises an active substance provided area in which the electrode active substance layer is provided on a surface of the electrode substrate and comprises a substrate exposed area in which the electrode substrate is exposed while the electrode active substance layer is not provided;
an active substance provided area cutting step for cutting the active substance provided area by a pulse laser; and
a substrate exposed area cutting step for cutting the substrate exposed area by the pulse laser,
wherein a frequency of the pulse laser in the substrate exposed area cutting step is made to be higher than a frequency of the pulse laser in the active substance provided area cutting step, and
a lap rate of the pulse laser in the substrate exposed area cutting step is made to be equal to or more than 90%.

2. The method for manufacturing the electrode plate according to claim 1, wherein the frequency of the pulse laser in the active substance provided area cutting step ranges from 100 kHz to 2000 kHz.

3. The method for manufacturing the electrode plate according to claim 1, wherein the frequency of the pulse laser in the substrate exposed area cutting step ranges from 450 KHz to 4000 KHz.

4. The method for manufacturing the electrode plate according to claim 1, wherein
a lap rate of the pulse laser in the active substance provided area cutting step is smaller than the lap rate of the pulse laser in the substrate exposed area cutting step.

5. A manufacturing method of a secondary battery provided with an electrode body in which a pair of electrode plates are opposed to each other through a separator,
the method comprising:
a step for manufacturing at least one of the pair of electrode plates by using the manufacturing method of the electrode plate according to claim 1; and a step for manufacturing the electrode body in which the pair of electrode plates are opposed to each other through the separator.

* * * * *